United States Patent
Miyazawa et al.

(10) Patent No.: US 9,383,710 B2
(45) Date of Patent: Jul. 5, 2016

(54) DRIVING TRANSMISSION DEVICE AND IMAGE FORMING APPARATUS

(71) Applicant: CANON KABUSHIKI KAISHA, Tokyo (JP)

(72) Inventors: Toru Miyazawa, Kawasaki (JP); Yuri Mori, Tokyo (JP); Kota Kiyama, Kawasaki (JP); Shuhei Hamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/667,536

(22) Filed: Mar. 24, 2015

(65) Prior Publication Data

US 2015/0277339 A1    Oct. 1, 2015

(30) Foreign Application Priority Data

Mar. 28, 2014 (JP) ................................. 2014-068638

(51) Int. Cl.
*G03G 15/00* (2006.01)
*F16H 55/38* (2006.01)
*F16H 7/02* (2006.01)

(52) U.S. Cl.
CPC ............... *G03G 15/757* (2013.01); *F16H 7/02* (2013.01); *F16H 55/38* (2013.01)

(58) Field of Classification Search
CPC ................................. F16H 55/38; B65G 54/02
See application file for complete search history.

(56) References Cited

U.S. PATENT DOCUMENTS

| | | | | |
|---|---|---|---|---|
| 5,867,760 A | * | 2/1999 | Mitsuoka | G03G 15/1685 399/313 |
| 5,884,133 A | * | 3/1999 | Morimoto | G03G 15/167 399/121 |
| 2013/0039679 A1 | * | 2/2013 | Nakaegawa | G03G 15/1615 399/297 |

FOREIGN PATENT DOCUMENTS

JP    H08-146783 A    6/1996

* cited by examiner

*Primary Examiner* — Clayton E Laballe
*Assistant Examiner* — Victor Verbitsky
(74) *Attorney, Agent, or Firm* — Canon USA, Inc., IP Division

(57) ABSTRACT

A driving transmission device includes a motor, a first pulley, a second pulley, an endless belt which is wound on the first pulley and the second pulley, dielectric layers disposed between the endless belt and the first pulley and between the endless belt and the second pulley, and a power source unit. A length of a portion of the endless belt which is wound on the second pulley is longer than a length of a portion of the endless belt which is wound on the first pulley. An amount of current supplied from the second pulley to the endless belt in a region in which the endless belt is wound on the second pulley is smaller than an amount of current supplied from the first pulley to the endless belt in a region in which the endless belt is wound on the first pulley.

15 Claims, 18 Drawing Sheets

DRIVING TRANSMISSION DEVICE AND IMAGE FORMING APPARATUS

BACKGROUND OF THE INVENTION

1. Field of the Invention

The present invention relates to a driving transmission device which transmits torque of a driving source to a driven unit by a belt wound on a driving pulley and a driven pulley, and an image forming apparatus.

2. Description of the Related Art

In general, various apparatuses including image forming apparatuses, such as copiers and printers, have a driving transmission device which transmits torque of a driving source, such as a motor, to a driven unit.

For example, a configuration in which a driving force of a motor serving as a driving source is transmitted to a driving roller which drives a photoconductor drum and an intermediate transfer belt which are driven unit through gears is employed in image forming apparatuses. However, in this configuration, a difference between rotation transmission of a driving gear and rotation transmission of a driven gear (for example, a mesh transmission difference) causes vibration. The generated vibration may be transmitted to gear supporting members, such as a shaft, bearings, and side plates, and driven members, and accordingly, large noise may be generated. If vibration is generated in such an image forming apparatus, a stripe image or an image having uneven density may be generated or deterioration, such as streaks or unevenness, may be generated in an image.

Accordingly, a driving transmission device having a configuration in which a belt is wound on a pulley connected to a driving source and a pulley connected to a driven unit has been developed. The driving transmission device has the pulleys and the belt absorbed by each other due to electrostatic absorption, and transmits the driving force of the driving source to the driven unit. An image forming apparatus disclosed in Japanese Patent Laid-Open No. 8-146783 has a configuration in which a driving roller drives an intermediate transfer belt. The image forming apparatus applies a bias voltage to a core metal of the driving roller so that an electrostatic absorption force is generated between the driving roller and the intermediate transfer belt and a driving force of the driving roller is transmitted to the intermediate transfer belt.

When a voltage is applied between a conductive portion of the belt and conductive portions of the pulleys so that an electrostatic force (Johnsen-Rahbek force) is generated, current is supplied to dielectric layers interposed between the belt and the pulleys and Joule heat is generated.

Here, a length of a portion of a belt which is wound on a pulley (winding length) and an electric resistance value are inversely proportional to each other. As an area of a portion of a pulley which is in contact with a belt is increased, a resistance value between the pulley and the belt is reduced. For example, in a case where a portion of a pulley on which a belt is wound is large in length, an area of a portion of the pulley which is in contact with the belt through a dielectric layer is large when compared with a case where a portion of the pulley on which the belt is wound is small in length. Therefore, a total value of resistance between a conductive portion of a pulley having a long winding length and a conductive portion of a belt is smaller.

Accordingly, if the same voltage is applied between a driving pulley and a belt and between a driven pulley and the belt so that the pulleys and the belt are absorbed with each other by an electrostatic force, an amount of current of the pulley having a small resistance value, that is, the pulley having a long winding length, is increased. Therefore, Joule heat is excessively increased in the pulley having a long winding length, and consequently, amounts of heat generation of the pulley and the belt are increased.

SUMMARY OF THE INVENTION

The present invention provides a driving transmission device including a motor, a first pulley rotated by the motor, a second pulley coupled with a rotary member, an endless belt which is wound on the first pulley and the second pulley, dielectric layers disposed between the endless belt and the first pulley and between the endless belt and the second pulley, and a power source unit which supplies voltages to the first pulley and the second pulley. A length of a portion of the endless belt which is wound on the second pulley is longer than a length of a portion of the endless belt which is wound on the first pulley. An amount of current supplied from the second pulley to the endless belt in a region corresponding to a certain length of the endless belt in which the endless belt is wound on the second pulley is smaller than an amount of current supplied from the first pulley to the endless belt in a region corresponding to a certain length of the endless belt in which the endless belt is wound on the first pulley.

Further features of the present invention will become apparent from the following description of exemplary embodiments with reference to the attached drawings.

DESCRIPTION OF THE EMBODIMENTS

Hereinafter, embodiments of the present invention will be described with reference to the accompanying drawings.

Members, numerical values, and materials used in the description below are merely example for assisting understanding, and the present invention is not limited to these.

First Embodiment

Figure 1:
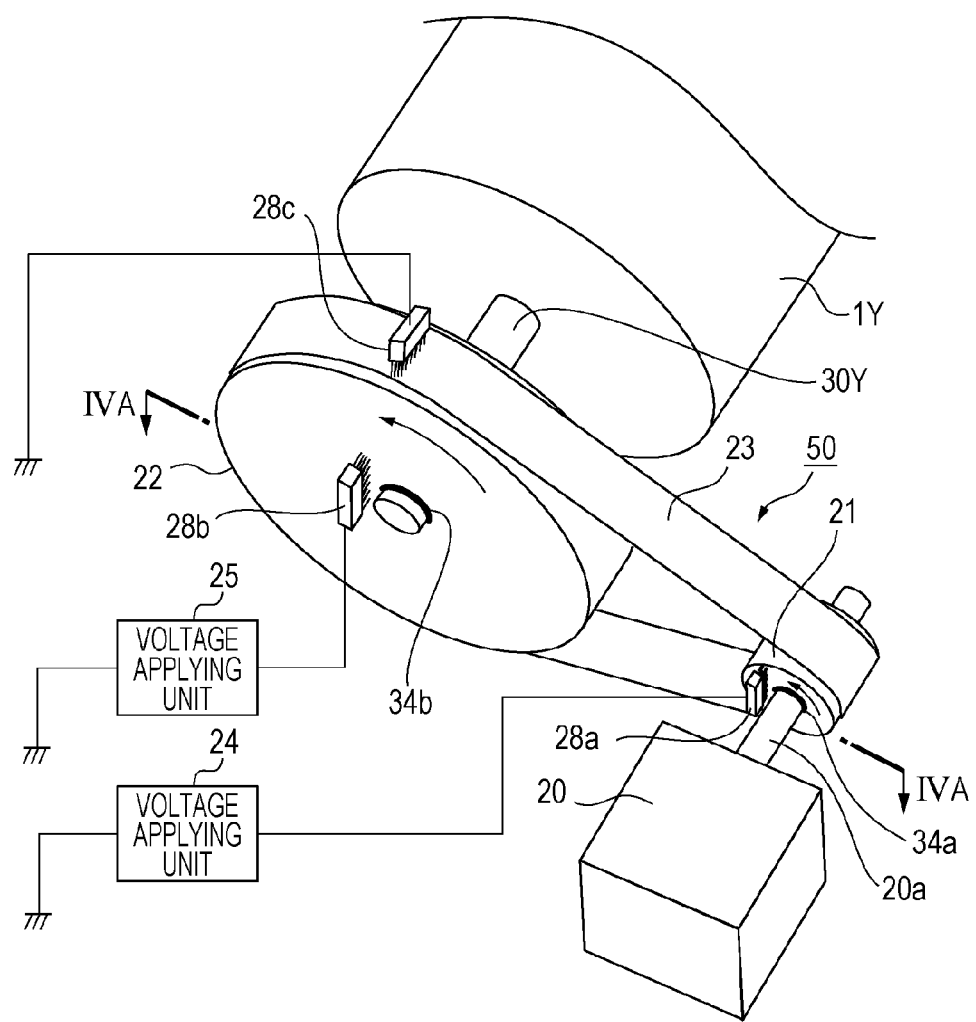
FIG. 1 is a perspective view of a driving transmission device according to a first embodiment.

FIG. 1 is a perspective view of a driving transmission device included in an image forming apparatus which is a printer employing an electrophotographic method.

A basic configuration and a basic operation of the image forming apparatus will be described with reference to FIGS. 2 and 3.

Figure 2:
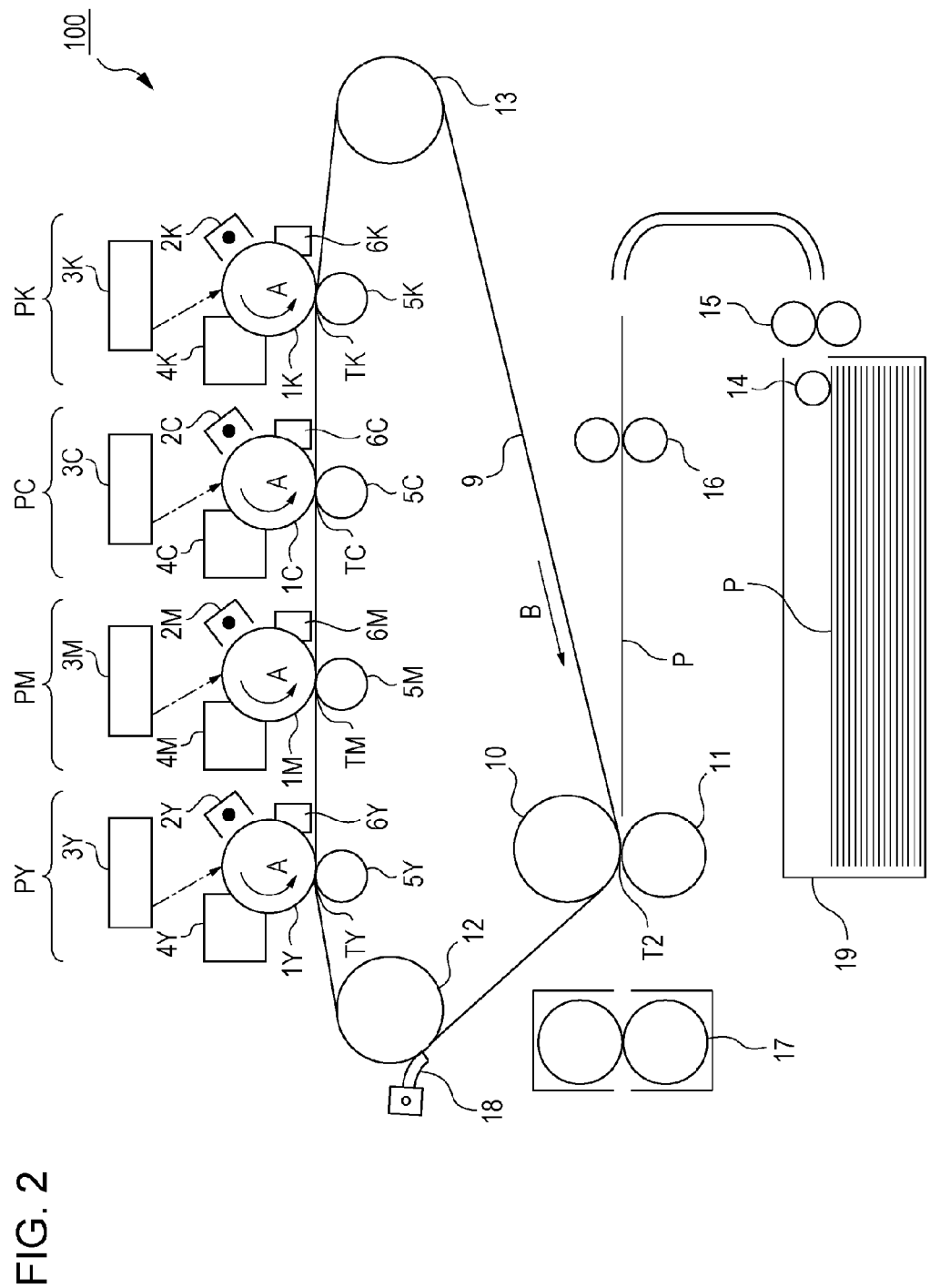
FIG. 2 is a sectional view of an image forming apparatus.

An image forming apparatus 100 illustrated in FIG. 2 is a full-color laser beam printer including image forming units PY, PM, PC, and PK of yellow, magenta, cyan, and black, respectively, along an intermediate transfer belt 9.

The image forming unit PY forms a yellow toner image on a photoconductor drum 1Y which is driven by rotation. A yellow tonner image which is supported by the photoconductor drum 1Y is conveyed by the rotation of the photoconductor drum 1Y. The image forming unit PY includes a power source D1 (FIG. 3) and a primary transfer roller 5Y which receives a voltage applied by the power source D1. The yellow toner image formed on the photoconductor drum 1Y is transferred on the intermediate transfer belt 9 by applying a voltage by the power source D1 to the primary transfer roller 5Y in a first transfer portion TY where the photoconductor drum 1Y and the primary transfer roller 5Y sandwich the intermediate transfer belt 9. Similarly, the image forming units PM, PC, and PK form a magenta toner image, a cyan toner image, and a black toner image on photoconductor drums 1M, 1C, and 1K, respectively. Then the magenta toner image, the cyan toner image, and the black toner image are transferred on the intermediate transfer belt 9 in first transfer portions TM, TC, and TK by primary transfer rollers 5M, 5C, and 5K, respectively. The tonner images of the individual colors are transferred on the intermediate transfer belt 9 in an overlapping manner, and in this way, a full-color toner image is supported on the intermediate transfer belt 9.

The intermediate transfer belt 9 is supported by being wound on a driving roller 13, a tension roller 12, and a backup roller 10 and is rotated in a direction of an arrow mark B in FIG. 2 along with rotation of the driving roller 13. The intermediate transfer belt 9 is strained and lifted upward by the primary transfer rollers 5Y, 5M, 5C, and 5K and the first transfer portions TY, TM, TC, and TK are formed between the intermediate transfer belt 9 and the photoconductor drums 1Y, 1M, 1C, and 1K, respectively.

The image forming apparatus 100 includes a power source D2 (FIG. 3) and a secondary transfer roller 11 which receives a voltage applied by the power source D2. The toner image supported by the intermediate transfer belt 9 is conveyed to a secondary transfer portion T2 in accordance with the rotation of the intermediate transfer belt 9. The toner image on the intermediate transfer belt 9 is transferred to a printing member P by applying a voltage by the power source D2 to the secondary transfer roller 11 in the secondary transfer portion T2. Toner which is not transferred, that is, toner which remains on the intermediate transfer belt 9, is removed by a cleaning blade 18 which abuts on the intermediate transfer belt 9 so that the intermediate transfer belt 9 becomes ready for forming a next image.

The printing member P is drawn from a sheet feeding cassette 19 by a sheet feeding roller 14, separated one by one by a separation device 15, and fed to a registration roller 16. The registration roller 16 causes a leading portion of the printing member P to match the toner image supported by the intermediate transfer belt 9 and supplies the printing member P to the secondary transfer portion T2. The printing member P which is subjected to the secondary transfer of the toner image is supplied to a fixing device 17 which performs heating and pressurizing on the printing member P. In this way, the image is fixed on a surface of the printing member P.

A charging device 2 (2Y, 2M, 2C, and 2K), an exposing device 3 (3Y, 3M, 3C, and 3K), and a developing device 4 (4Y, 4M, 4C, and 4K) are disposed near the photoconductor drum 1 (1Y, 1M, 1C, and 1K). The primary transfer roller 5 (5Y, 5M, 5C, and 5K) and a cleaning device 6 (6Y, 6M, 6C, and 6K) are further disposed near the photoconductor drum 1 (1Y, 1M, 1C, and 1K).

The image forming units PY, PM, PC, and PK will be described in detail with reference to FIG. 3. The image forming units PY, PM, PC, and PK are configured the same as one another except for colors of the toners of the developing devices 4Y, 4M, 4C, and 4K. Therefore, only the image forming unit PY for yellow is described hereinafter and descriptions of the image forming units PM, PC, and PK are omitted.

Figure 3:
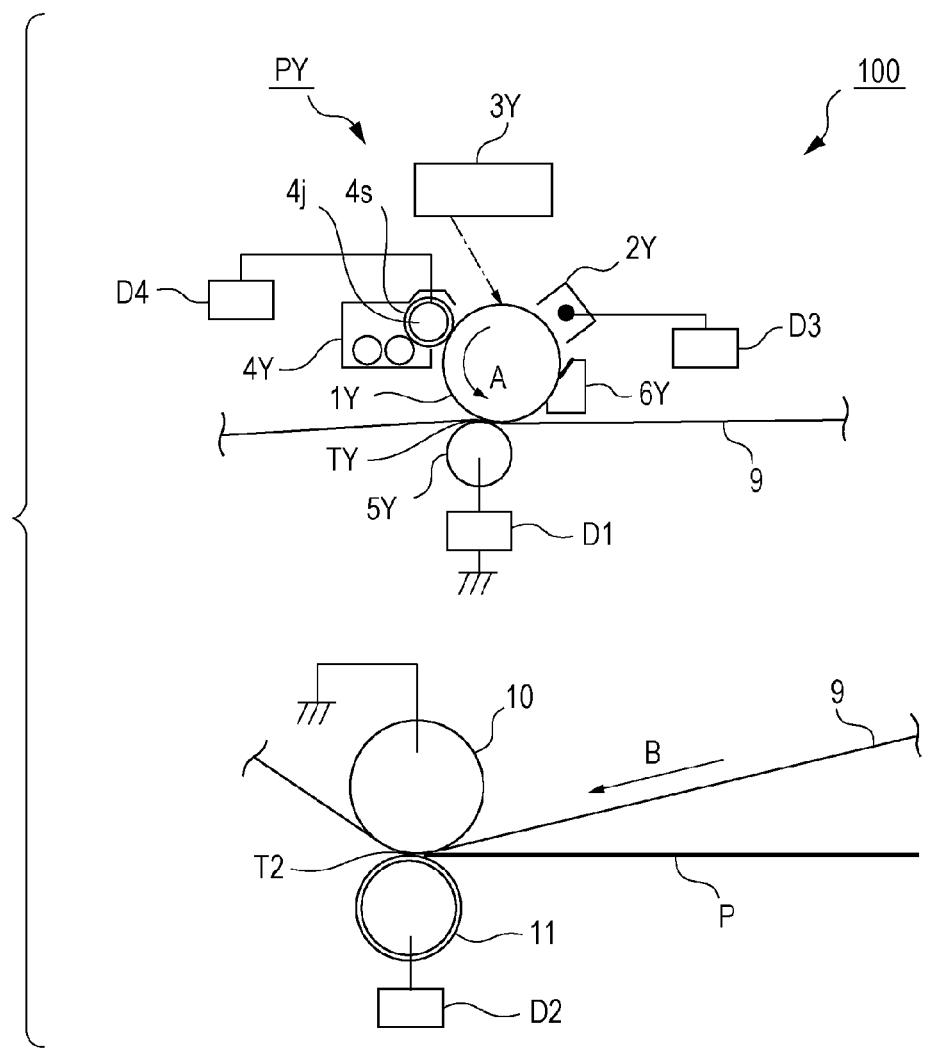
FIG. 3 is a sectional view of an essential portion of the image forming apparatus.

FIG. 3 is a sectional view of the image forming unit PY, a primary transfer portion, and the secondary transfer portion T2.

The photoconductor drum 1Y is formed by an aluminum cylinder having an outer circumference surface to which an organic photoconductor layer having a negative charging polarity is applied so that a photoconductive layer is formed. The photoconductor drum 1Y rotates in a direction of an arrow mark A. The charging device 2Y irradiates charged particles to a surface of the photoconductor drum 1Y when receiving a negative voltage applied by a power source D3 so that the surface of the photoconductor drum 1Y is uniformly electrified by a negative potential. The exposing device 3Y controls a laser beam on the basis of yellow image data. A rotation mirror polarizes a laser beam so that the laser beam scans the photoconductor drum 1Y. In this way, the exposing device 3Y exposes the photoconductor drum 1Y. By this, an electrostatic latent image corresponding to image data is formed on the surface of the charged photoconductor drum 1Y.

The developing device 4Y agitates a two-component developer including the toner and a magnetic carrier so as to negatively charge the tonner. The charged toner is supported by a developing sleeve 4s which rotates in a counter direction relative to the photoconductor drum 1Y around a fixed magnetic pole 4j and frictionally slides on the photoconductor drum 1Y.

A power source D4 applies a developing voltage obtained by superposing an alternate voltage on a negative direct voltage to the developing sleeve 4s so that the toner is attached to the electrostatic latent image of the photoconductor drum 1Y which has a positive polarity relative to the developing sleeve 4s. In this way, the electrostatic latent image is developed as a toner image.

The primary transfer roller 5Y and the photoconductor drum 1Y pinches the intermediate transfer belt 9 and forms the first transfer portion TY in a portion between the photoconductor drum 1Y and the intermediate transfer belt 9. The power source D1 applies a direct voltage of a positive polarity to the primary transfer roller 5Y. The toner supported by the photoconductor drum 1Y is negatively charged. Therefore, the toner image on the photoconductor drum 1Y is transferred to the intermediate transfer belt 9 by the direct voltage of the positive polarity applied from the power source D1 through the primary transfer roller 5Y. The cleaning device 6Y frictionally slides a cleaning blade on the photoconductor drum 1Y so as to remove transfer residual toner remaining on a surface of the photoconductor drum 1Y through the first transfer portion TY.

The secondary transfer roller 11 is pressed against the backup roller 10 through the intermediate transfer belt 9 so that the secondary transfer portion T2 is formed in a portion between the intermediate transfer belt 9 and the secondary transfer roller 11. The secondary transfer portion T2 supports and conveys the printing member P. The toner image is secondary transferred on the printing member P from the intermediate transfer belt 9 while the printing member P passes the secondary transfer portion T2.

The power source D2 applies a direct voltage of a positive polarity to the secondary transfer roller 11 so as to supply a transfer current to a series circuit including the backup roller 10, the intermediate transfer belt 9, the printing member P, and the secondary transfer roller 11. The transfer current relates to the transfer of the toner from the intermediate transfer belt 9 to the printing member P.

Although the case where the image forming apparatus 100 has the four image forming units has been described, the image forming apparatus 100 may have only an image forming unit which forms a black toner image, for example.

Next, a configuration of the driving transmission device 50 will be described with reference to FIG. 1, FIGS. 4A to 4C, and FIG. 5. The driving transmission device 50 electrostatically attracts a pulley and a belt to each other utilizing an electrostatic absorption force (Johnsen-Rahbek force) so as to increase a transmittable driving force.

The photoconductor drum 1Y is illustrated as a driven unit which is driven by rotation by a rotation driving force transmitted from a driving source, and a motor 20 is illustrated as the driving source.

When the driving transmission device 50 is employed in the image forming apparatus 100, a component which performs an operation associated with image forming by rotation is appropriately used as the driven unit, and not only the photoconductor drum 1 but also the driving roller 13 which drives the intermediate transfer belt 9, a fixing roller included in the fixing device 17, or the like is appropriately used. However, the driven unit is not limited to these.

As illustrated in FIG. 1, the driving transmission device 50 includes a driving pulley 21, a driven pulley 22, and an endless belt 23. A rotation driving force of the motor 20 is transmitted to the photoconductor drum 1Y through the driving pulley 21, the belt 23, and the driven pulley 22. The belt 23 is wound on the driving pulley 21 and the driven pulley 22, and power is transmitted by a friction force between the belt 23 and the driving pulley 21 a friction force between the belt 23 and the driven pulley 22. The belt 23 is a flat belt, for example, but the belt 23 may be a V belt, a V ribbed belt, or the like.

Here, the driven pulley 22 which has a large region in which the belt 23 is wound (that is, a region with which the belt 23 is in contact) has a larger transmittable driving force than the driving pulley 21 having a small region in which the belt 23 is wound (that is, a region with which the belt 23 is in contact). Therefore, if a driving force is transmitted without using the electrostatic absorption force, slip is likely to occur between the driving pulley 21 which has the short winding length and the belt 23. Accordingly, a transmittable driving force is required to be increased by increasing the electrostatic absorption force of the driving pulley 21.

Figure 4A:
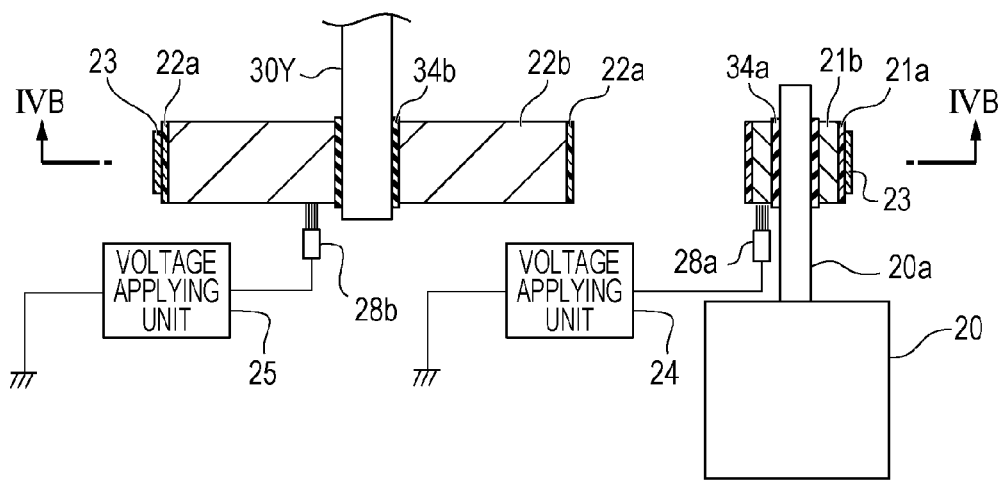
FIG. 4A is a sectional view taken along a line IVA of FIG. 1.
Figure 4B:
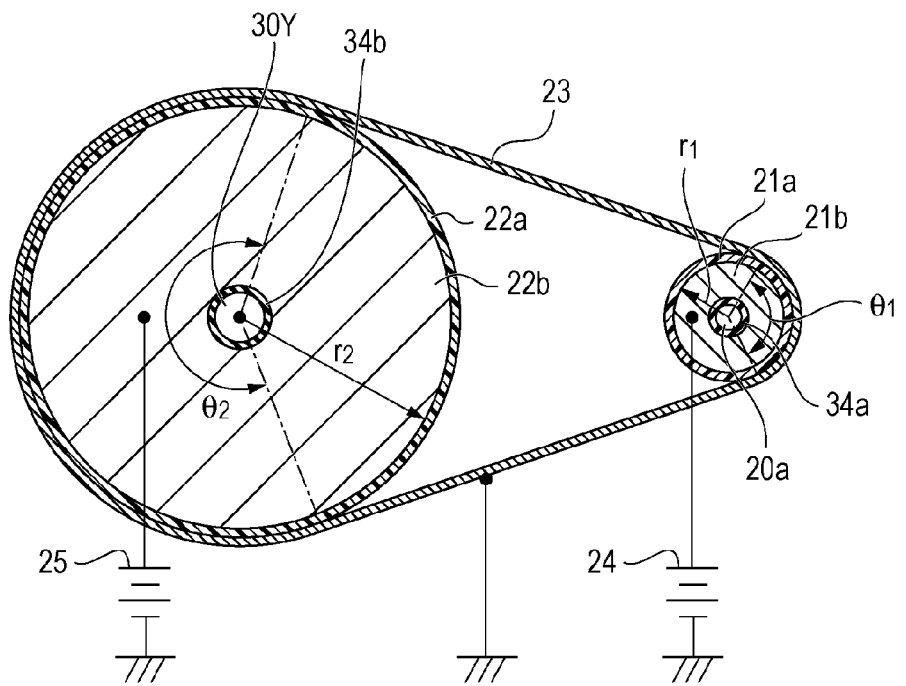
FIG. 4B is a sectional view taken along a line IVB of FIG. 4A.
Figure 4C:
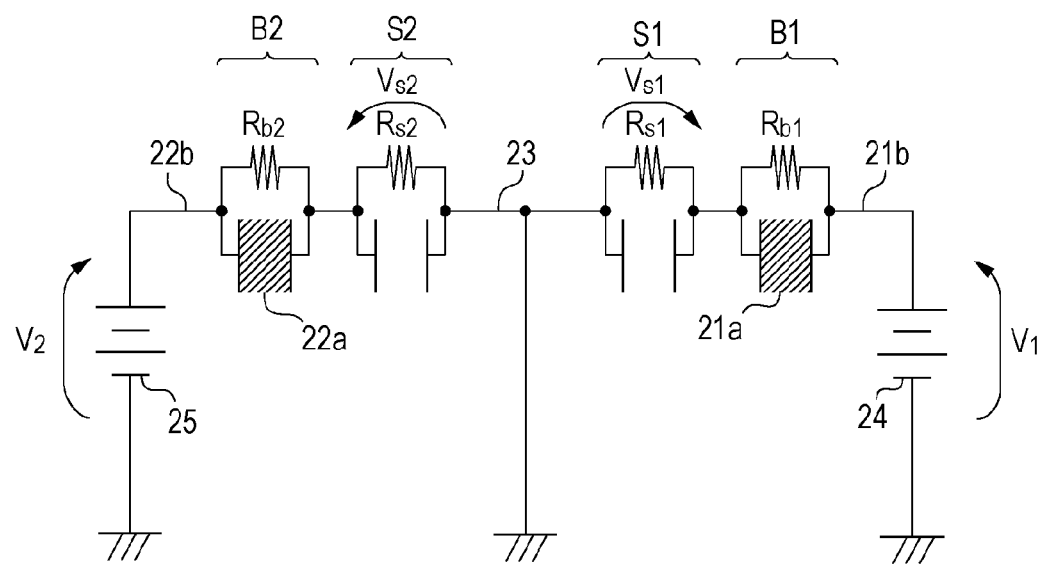
FIG. 4C is a diagram illustrating an equivalent circuit of the driving transmission device.

FIG. 4A is a sectional view taken along a line IVA of FIG. 1. FIG. 4B is a sectional view taken along a line IVB of FIG. 4A, and a voltage to be applied is schematically illustrated. FIG. 4C is a diagram illustrating an equivalent circuit which represents an electric characteristic of the driving transmission device 50.

As illustrated in FIG. 4B, a radius $r_1$ of the driving pulley 21 is 20 mm and a winding angle $\theta_1$ of the belt 23 wound on the driving pulley 21 is 120 degrees. A radius $r_2$ of the driven pulley 22 is 120 mm, and a winding angle $\theta_2$ of the belt 23 relative to the driven pulley 22 is 240 degrees. A difference between the radii of the driving pulley 21 and the driven pulley 22 reduces a speed of the rotation in a range from the driving pulley 21 to the driven pulley 22.

Furthermore, since a winding length of the belt 23 (hereinafter simply referred to as a "belt winging length" where appropriate) may be obtained as a the product of a radius and a winding angle [rad], a winding length relative to the driving pulley 21 is approximately 21 mm and a winding length relative to the driven pulley 22 is approximately 252 mm. A rotary shaft of the driving pulley 21 is connected to the motor 20, and a rotary shaft of the driven pulley 22 is connected to the photoconductor drum 1Y.

Furthermore, transmission of a driving force from the driving pulley 21 to the belt 23 and transmission of a driving force from the belt 23 to the driven pulley 22 are performed by friction forces acting on contact surfaces positioned therebetween. As described hereinafter, a normal force used to generate the friction forces is generated using the electrostatic absorption force, particularly, the Johnsen-Rahbek force.

First, components included in the driving transmission device 50 will be described. As illustrated in FIGS. 4A and 4B, the driving pulley 21 which is coupled with an output shaft 20a of the motor 20 includes a dielectric layer 21a on a side in which the driving pulley 21 is in contact with the belt 23 (an outer circumference surface) and a metal layer 21b below the dielectric layer 21a (an inner side in a radial direction). The dielectric layer 21a is formed by a resin material of polyimide having a volume resistivity of $10^{11}$ Ω·cm, a thickness (film thickness) of approximately 70 μm, and a width of approximately 10 mm. The metal layer 21b serving as a conductive portion functions as an electrode of the driving pulley 21.

Similarly to the driving pulley 21, the driven pulley 22 coupled with a rotary shaft 30Y of the photoconductor drum 1Y has a dielectric layer 22a on a side in which the driven pulley 22 is in contact with the belt 23 (an outer circumference surface) and a metal layer 22b below the dielectric layer 22a (an inner side in a radial direction). The dielectric layer 22a is formed by a resin material of polyimide having a volume resistivity of $10^{11}$ Ω·cm, a thickness of approximately 70 μm, and a width of approximately 10 mm. The metal layer 22b serving as a conductive portion functions as an electrode of the driven pulley 22.

Next, an electrical connection configuration will be described. Voltage applying units 24 and 25 which are different direct high voltage power sources are disposed to apply voltages to the driving pulleys 21 and 22, respectively. A direct voltage is applied from the voltage applying unit 24 to the metal layer 21b of the driving pulley 21 through a conductive brush 28a. A coupling portion between the metal layer 21b of the driving pulley 21 and the output shaft 20a is insulated by an insulation member 34a.

A direct voltage is applied from the voltage applying unit 25 to the metal layer 22b of the driven pulley 22 through a conductive brush 28b. Furthermore, a coupling portion between the metal layer 22b of the driven pulley 22 and the rotary shaft 30Y is insulated by an insulation member 34b. The belt 23 is formed by a conductive metallic material and is grounded (GND) through a conductive brush 28c (FIG. 1) as illustrated in FIG. 1.

Next, a voltage which generates the electrostatic absorption force (Johnsen-Rahbek force) will be described with reference to an equivalent circuit illustrated in FIG. 4C.

A contact surface (contact boundary) between the belt 23 and the dielectric layer 21a of the driving pulley 21 actually has portions in which the belt 23 and the dielectric layer 21a are in contact with each other and portions in which the belt 23 and the dielectric layer 21a are not in contact with each other in a microscopic view. Similarly, a contact surface (contact boundary) between the belt 23 and the dielectric layer 22a of the driven pulley 22 actually has portions in which the belt 23 and the dielectric layer 22a are in contact with each other and portions in which the belt 23 and the dielectric layer 22a are not in contact with each other in a microscopic view. Therefore, when a voltage is applied to a portion between the metal layer 21b of the driving pulley 21 and the belt 23, although current is supplied in a portion in which the dielectric layer 21a and the belt 23 are in contact with each other, voltage drop locally occurs due to a contact resistance in portions which sandwich the contact portion between the dielectric layer 21a and the belt 23. Then positive and negative charges are induced in the dielectric layer 21a and the belt 23 with a gap between the dielectric layer 21a and the belt 23, a considerably large electric field is generated in the gap, and large absorption force is generated due to the induced positive and negative charges. This absorption force is referred to as the "Johnsen-Rahbek force". In general, the Johnsen-Rahbek force becomes large when a volume resistivity of a dielectric body is equal to or larger than $1 \times 10^9$ Ω·cm and smaller than $1 \times 10^{14}$ Ω·cm.

As illustrated in FIG. 4C, since the Johnsen-Rahbek force is the electrostatic absorption force of the contact portion, an electric resistance in a portion including contact portions S1 and S2 in which the driving pulleys 21 and 22 are in contact with the belt 23 and an electric resistance in a portion including dielectric bulk portions B1 and B2 are separately considered. It is assumed that the dielectric bulk portion B1 and the contact portion S1 are located between the metal layer 21b of the driving pulley 21 and the belt 23, and the dielectric bulk portion B2 and the contact portion S2 are located between the metal layer 22b of the driven pulley 22 and the belt 23.

The contact portions S1 and S2 and the dielectric bulk portions B1 and B2 may be represented as parallel connection of resistance components and capacitor components as illustrated in FIG. 4C. The voltage applying units 24 and 25 apply voltages to the metal layer 21b of the driving pulley 21 and the metal layer 22b of the driven pulley 22, respectively, and the belt 23 is grounded. The voltage applying unit 24 applies a potential difference $V_1$ to a portion between the metal layer 21b of the driving pulley 21 and the belt 23. The voltage applying unit 25 applies a potential difference $V_2$ to a portion between the metal layer 22b of the driven pulley 22 and the belt 23.

In this equivalent circuit, voltages $V_{s1}$ and $V_{s2}$ applied to the contact portions S1 and S2 generate the Johnsen-Rahbek force. The voltages $V_{s1}$ and $V_{s2}$ are obtained by voltage dividing of resistances $R_{s1}$ and $R_{s2}$ of the contact portions S1 and S2 and resistances $R_{b1}$ and $R_{b2}$ of the dielectric bulk portions B1 and B2. The voltages $V_{s1}$ and $V_{s2}$ are represented by Expressions 1 and 2 below.

$$V_{s1} = \frac{R_{s1}}{R_{s1} + R_{b1}} \times V_1 \quad \text{[Expression 1]}$$

$$V_{s2} = \frac{R_{s2}}{R_{s2} + R_{b2}} \times V_2 \quad \text{[Expression 2]}$$

The Johnsen-Rahbek force is generated due to an electric field in the capacitor components of the contact portions S1 and S2 by the voltages applied to the contact portions S1 and S2, and the belt 23 and the driving pulley 21 and the belt 23 and the driven pulley 22 are electrostatically attracted to each other.

Next, increase of a transmittable driving force due to operation of the electrostatic absorption force generated by applying a voltage will be described.

In general, when power is transmitted using a belt, the power is transmitted on the basis of a difference between tension applied to a portion in a most upstream position of a pulley in which the belt is in contact with the pulley in a belt moving direction and tension applied to a portion in a most downstream position of the pulley in which the belt is separated from the pulley in the belt moving direction. Therefore, as a definition of a driving force, a driving force corresponds to the difference between the tension of the belt operated in the most upstream position and the tension of the belt operated in the most downstream position. Specifically, a driving force to be transmitted is equal to the difference between the tensions. The tension difference which may be generated depends on a maximum friction force which may be generated between the pulley and the belt. In general, in belt driving transmission without using the electrostatic absorption force, a transmittable driving force $F_1$ is represented by Expression 3 below by Euler's formula.

$$F_1 = \frac{e^{\mu\theta} - 1}{e^{\mu\theta} + 1} \left( \frac{T}{\sin\frac{\theta}{2}} \right) \quad \text{[Expression 3]}$$

Here, it is assumed that tension of the belt is denoted by "T". Furthermore, it is assumed that a winding angle of the belt relative to the pulley is denoted by θ, and a friction coefficient between the belt and the pulley is denoted by μ.

Moreover, assuming that an electrostatic absorption force per unit area is denoted by P, a radius of the pulley is denoted by r, and a width in which a pulley electrode and the belt face each other (hereinafter referred to as a "electrode facing width" where appropriate) is denoted by b, a transmittable driving force $F_2$ obtained when the electrostatic absorption force P is added is represented by Expression 4 below.

$$F_2 = \frac{e^{\mu\theta} - 1}{e^{\mu\theta} + 1} \left( \frac{T}{\sin\frac{\theta}{2}} + 2 \cdot r \cdot b \cdot P \right) \quad \text{[Expression 4]}$$

Specifically, an increment ΔF of the transmittable driving force obtained when the electrostatic absorption force P is added corresponds to a difference between the driving force $F_2$ and the driving force $F_1$ which is represented by Expression 5 below.

$$\Delta F = F_2 - F_1 = \frac{e^{\mu\theta} - 1}{e^{\mu\theta} + 1}(2 \cdot r \cdot b \cdot P) \quad \text{[Expression 5]}$$

The driving forces $F_1$ and $F_2$ and the increments $\Delta F$ of the driving pulley 21 and the driven pulley 22 may be calculated in accordance with Expressions 3 to 5 by assigning radii r, electrode facing widths b, friction coefficients µ, and winding angles θ of the driving pulley 21 and the driven pulley 22.

Here, an electrostatic absorption force $P_1$ per unit area generated between the driving pulley 21 and the belt 23 is considered as a force acting between electrodes of the capacitance component of the contact portion S1 between the driving pulley 21 and the belt 23 and is represented by Expression 6 below.

$$P_1 = \frac{1}{2} \cdot \varepsilon_{air} \cdot k \frac{1}{d^2} V_{s1}^2 \quad \text{[Expression 6]}$$

Here, $\varepsilon_{air}$ represents permittivity of a gap of the contact portion S1, that is, permittivity of air, d represents an average distance of the gap of the contact portion S1, and k represents a coefficient determined in accordance with a rate of a contact area. A voltage $V_{s1}$ is applied between a surface portion of the metal layer 21b of the driving pulley 21 and the belt 23 and is obtained by Expression 1.

Note that, when an electrostatic absorption force $P_2$ per unit area generated between the driven pulley 22 and the belt 23 is to be obtained, permittivity of a gap of the contact portion S2 is used as $\varepsilon_{air}$ and an average distance of the gap of the contact portion S2 is used as d on the right side of Expression 6. Furthermore, a coefficient k and a voltage $V_{s2}$ associated with the driven pulley 22 are used.

Figure 5:
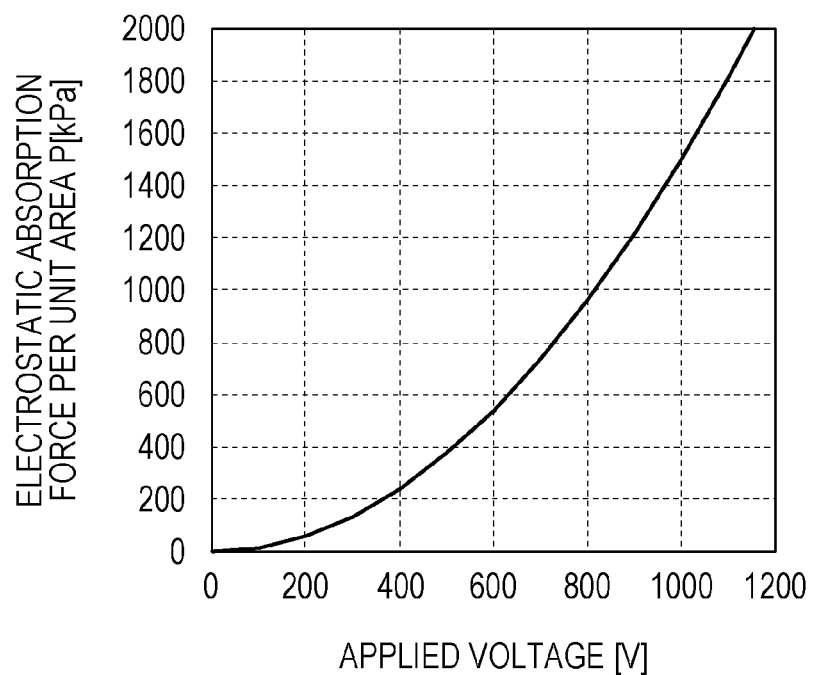
FIG. 5 is a diagram illustrating the relationship between an applied voltage and an electrostatic absorption force per unit area.

FIG. 5 is a diagram illustrating the relationship between an applied voltage and the electrostatic absorption force P per unit area which are calculated from a measurement result using a pulley and a belt which are actually fabricated as an example. As illustrated in FIG. 5, the electrostatic absorption force P per unit area is increased in proportion to a square of the applied voltage.

An increment $\Delta F$ of the driving force transmittable from the driving pulley 21 to the belt 23 may be calculated by assigning the electrostatic absorption force $P_1$ obtained by Expression 6 to P of Expression 5. The increment $\Delta F$ increases in proportion to a square of a voltage applied between the pulley 21 and the belt 23.

In the description hereinabove, the driving force transmittable between the driving pulley 21 and the belt 23 is described. A driving force transmittable between the driven pulley 22 and the belt 23 may be similarly calculated.

An excessive transmittable driving force which causes generation of excessive Joule heat and a method for reducing the Joule heat by reducing an excessive electrostatic absorption force will be described on the basis of the description described above. First, the transmittable driving force which generates the excessive Joule heat will be described.

In the driving transmission device 50, a winding length of the belt 23 relative to the driving pulley 21 and a winding length of the belt 23 relative to the driven pulley 22 are different from each other. In this state, it is assumed that voltages of the same value are applied between the driving pulley 21 and the belt 23 and between the driven pulley 22 and the belt 23. Since the electrostatic absorption force P per unit area is the same, an electrostatic absorption force of the driving pulley 21 which has the short belt winding length is smaller than that of the driven pulley 22 which has the long belt winding length since an area in which the driving pulley 21 is in contact with the belt 23 is small.

In driving of a belt wound on a plurality of pulleys, slip occurs in one of the pulleys having the smallest transmittable driving force, and accordingly, a transmittable driving force in an entire decelerating system is determined by a transmittable driving force of the driving pulley 21. When the same voltage is applied to the driving pulley 21 and the driven pulley 22, an excessive transmittable driving force is generated in the driven pulley 22.

A current amount will now be considered. It is assumed that various conditions (thicknesses t, volume resistivities, electrode facing widths b, and the like of the dielectric layers 21a and 22a) other than the winding lengths are the same as each other. In this case, a total resistance value of the contact portion S1 and the dielectric bulk unit B1 and a total resistance value of the contact portion S2 and the dielectric bulk unit B2 are inversely proportional to the corresponding winding lengths.

Here, it is assumed that an amount of current per unit length of winding of the belt 23 supplied to the dielectric layer 21a disposed between the metal layer 21b of the driving pulley 21 and the belt 23 is denoted by i1. It is assumed that an amount of current per unit length of winding of the belt 23 supplied to the dielectric layer 22a disposed between the metal layer 22b of the driven pulley 22 and the belt 23 is denoted by i2. When the same voltage is applied, the current amount i1 is substantially the same as the current amount i2. Accordingly, if the same voltage is applied ($V_1=V_2$), although the current amount of the driven pulley 22 having the long winding length is larger than that of the driving pulley 21, a transmittable driving force becomes excessive and excessive heat is generated.

Therefore, the voltages applied to the driving pulley 21 and the driven pulley 22 are set such that the current amount i2 per unit belt winding length is smaller than the current amount i1. To most appropriately suppress excessive heat, when the current amount i1 is set larger than the current amount i2, a transmittable driving force of the driving pulley 21 and that of the driven pulley 22 are preferably coincide with each other. An effect of suppression of heat generation may be obtained only by reducing the current amount i2 to some extent so that the current amount i2 becomes smaller than the current amount i1.

Hereinafter, concrete solutions will be described.

In this embodiment, the two individual voltage applying units 24 and 25 are provided and a voltage applied to the driven pulley 22 having the long belt winging length is set smaller than a voltage applied to the driving pulley 21 having a short belt winding length ($V_2<V_1$). An amount of heat generation is determined in accordance with a voltage applied to a pulley and a current supplied to the pulley. Accordingly, an amount of current supplied between the driven pulley 22 and the belt 23 is reduced by reducing an excessive transmittable driving force in the driven pulley 22 so that Joule heat to be generated is reduced.

As a concrete example, a setting of voltages applied to the driving pulley 21 and the driven pulley 22 in a case where 2.5 kgf is to be ensured as transmittable driving forces ($F_1$ and $F_2$) in the driving pulley 21 and the driven pulley 22 is considered.

Magnitudes of the electrostatic absorption forces P ($P_1$ and $P_2$) per unit area required for the driving pulley 21 and the driven pulley 22 are calculated in accordance with Expressions 4 and 6. It is assumed that a tension T of the belt 23 is 0, a friction coefficient μ between the belt 23 and the pulleys 21 and 22 is 0.3, and electrode facing widths b are 10 mm in common. Furthermore, as described above, the driving pulley 21 has a diameter $r_1$ of 20 mm and a winding angle $\theta_1$ of 120 degrees and the driven pulley 22 has a diameter $r_2$ of 120 mm and a winding angle $\theta_2$ of 240 degrees.

In this case, magnitudes of the electrostatic absorption forces $P_1$ and $P_2$ per unit area required for the driving pulley 21 and the driven pulley 22 are approximately 400 kPa and approximately 37 kPa, respectively. Values of voltages required for generating such electrostatic absorption forces P are 520 V for the driving pulley 21 and 160 V for the driven pulley 22.

When the voltages ($V_1$=520 V and $V_2$=160 V) are applied, currents supplied to the driving pulley 21 and the driven pulley 22 are 0.27 mA and 0.04 mA, respectively. Furthermore, power consumption in the driven pulley 22 is 6.4 mW (160×0.04).

On the other hand, when a voltage of 520 V is applied to the driving pulley 21 and the driven pulley 22 in common ($V_1$=$V_2$=520 V), following currents are supplied to the driving pulley 21 and the driven pulley 22. Specifically, a current of 0.27 mA is supplied to the driving pulley 21 and a current of 3.25 mA is supplied to the driven pulley 22. Furthermore, power consumption in the driven pulley 22 is 1690 mW (520×3.25).

Consequently, power consumption of the driven pulley 22 is reduced from 1690 mW to 6.4 mW, that is, an amount of generated heat is considerably reduced. Accordingly, an entire amount of heat generated between the belt 23 and the pulleys 21 and 22 may be reduced while driving forces required for the pulleys 21 and 22 are ensured.

As described above, in this embodiment, first, a potential difference is applied between the pulleys 21 and 22 and the belt 23 so that the pulleys 21 and 22 and the belt 23 are electrostatically absorbed to each other. In this way, a fraction force is increased and slip which occurs in driving force transmission may be suppressed. Generation of vibration and noise is considerably reduced when compared with a transmission mechanism employing a gear.

Furthermore, in the configuration in which the winding length of the belt 23 relative to the first pulley (driving pulley 21) is longer than the winding length of the belt 23 relative to the second pulley (driven pulley 22), the voltage $V_2$ is smaller than the voltage $V_1$. Specifically, the voltage applying unit 24 applies a first potential difference between the metal layer 21b (conductive portion) of the driving pulley 21 and the belt 23. Furthermore, the voltage applying unit 25 applies a second potential difference which is smaller than the first potential difference between the metal layer 22b (conductive portion) of the driven pulley 22 and the belt 23. Accordingly, the current amount i2 is smaller than the current amount i1 and the Joule heat is reduced.

According to this embodiment, even when the belt winding lengths of the pulleys are different from each other, reduction of vibration and noise and prevention of slip of the belt relative to the pulleys may be attained, and furthermore, heat generated between the pulleys and the belt may be suppressed.

Furthermore, deformation and deterioration of the belt 23 and the pulleys 21 and 22 and increase in temperature in the image forming apparatus caused by excessively-generated heat may be suppressed. Moreover, change of resistance values of the belt 23 and the pulleys 21 and 22 caused by change of a length of the belt 23 and deformation of the pulleys 21 and 22 due to heat generation may be suppressed. Accordingly, driving forces may be stably transmitted.

In this embodiment, the configuration in which the belt winding length of the driven pulley 22 is longer than that of the driving pulley 21 is described. However, in a reverse case, the magnitude relationship between the applied voltages is reversed. Furthermore, a plurality of driven pulleys may be provided, and a setting of applied voltages is considered taking the relationship between, among a plurality of pulleys including a driving pulley and the driven pulleys, a first pulley and a second pulley having a winding length of the belt 23 which is longer than that of the first pulley into consideration. Specifically, a voltage applied to the second pulley is set smaller than a voltage applied to the first pulley. Preferably, the first pulley corresponds to one of the plurality of pulleys which has a shortest belt winding length.

A configuration in which a belt winding length of a driving pulley is longer than that of a driven pulley may be employed in an acceleration system in which a diameter of the driving pulley is larger than that of the driven pulley or a system in which belt winding angles are changed by additionally providing a tension roller or a tension member.

Note that, although the belt 23 is grounded in this embodiment, voltages may be applied without grounding the belt 23, as long as the voltages are applied between the pulleys 21 and 22 and the belt 23 taking the magnitude relationship between the belt winding lengths into consideration so that electrostatic absorption forces are generated.

Although the dielectric layers are provided in the pulleys 21 and 22, the dielectric layers may be provided on surfaces of the belt 23 which face outer circumferences of the pulleys 21 and 22 or provided on the both sides, that is, the pulleys 21 and 22 and the belt 23. Accordingly, in regions in which the belt 23 is wound on the pulleys 21 and 22, dielectric layers are interposed between the conductive portion (metal layer, for example) of the belt 23 and the conductive portions of the pulley 21 and 22. Note that, when three or more pulleys are provided, at least one of the pulleys may be located on an outside of a ring shape of the belt 23. In this case, a dielectric layer is provided between the pulley disposed on the outside of the ring shape of the belt 23 and the belt 23.

Although the case where the tension T is 0 is described so that operation of the electrostatic absorption forces are easily recognized, a value may be set to the tension T. In this case, a transmittable driving force associated with the tension T is also considered.

The belt 23, the driving pulley 21, and the driven pulley 22 may have a portion which does not have conductivity (a resin portion, for example) as long as electric coupling is not blocked.

Second Embodiment

In the first embodiment, a potential difference is generated by providing the two individual voltage applying units 24 and 25 so that the current amount i2 becomes smaller than the current amount i1. On the other hand, in a second embodiment of the present invention, even when a single voltage applying unit is used, a voltage applied to a driven pulley 22 having a long belt winding length is smaller than a voltage applied to the driving pulley 21 having a short belt winding length.

Figure 6:
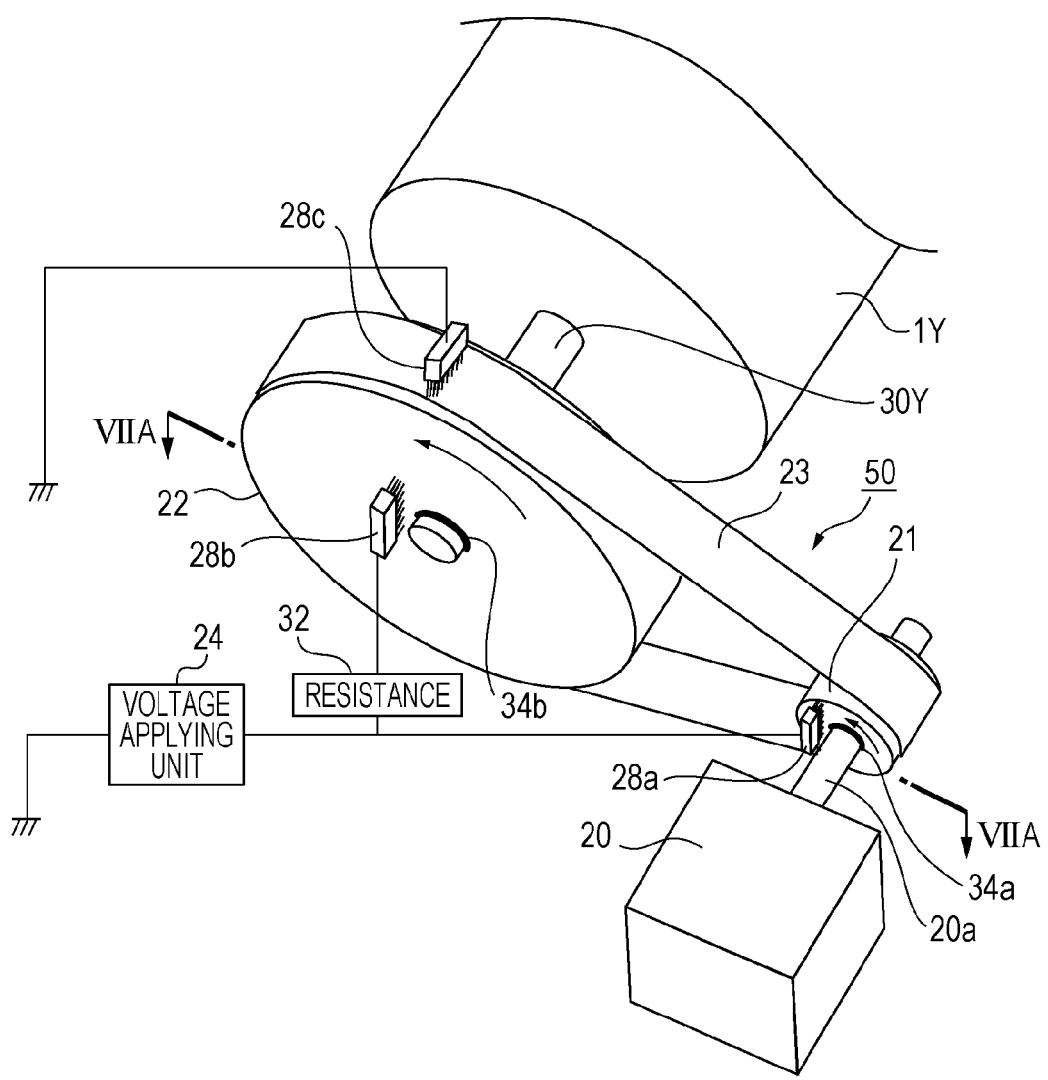
FIG. 6 is a perspective view of a driving transmission device according to a second embodiment.
Figure 7A:
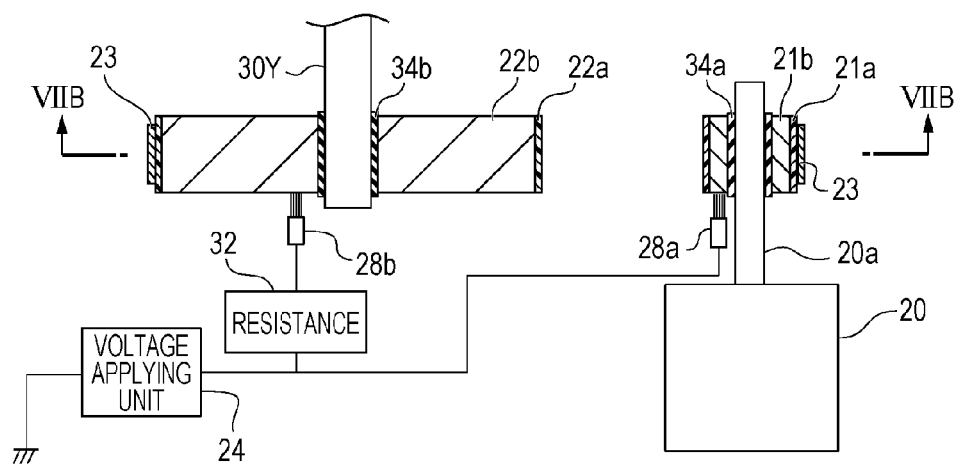
FIG. 7A is a sectional view taken along a line VIIA of FIG. 6.
Figure 7B:
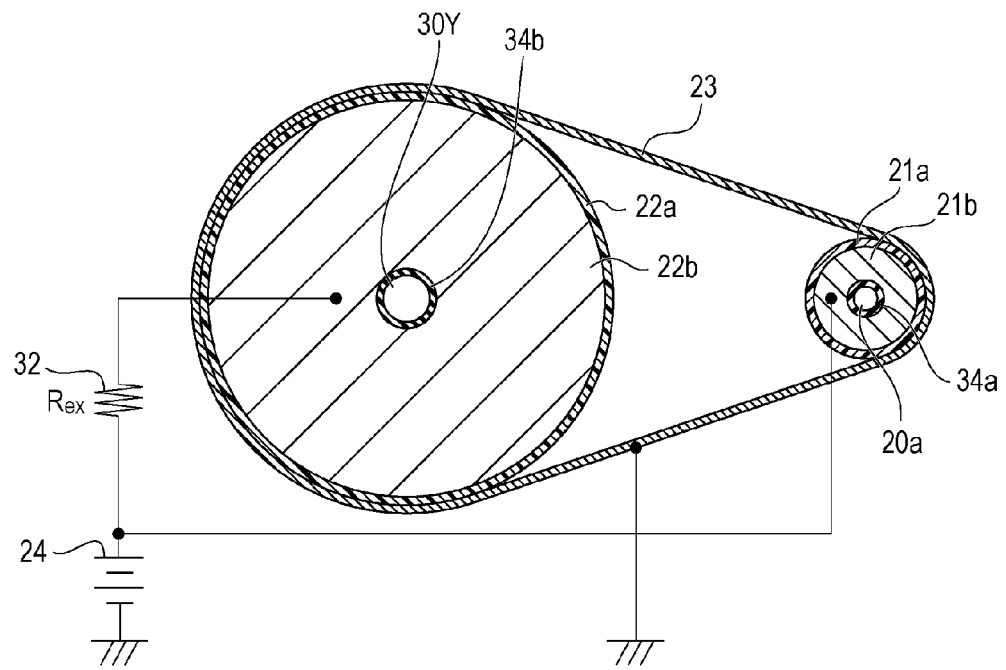
FIG. 7B is a sectional view taken along a line VIIB of FIG. 7A.
Figure 7C:
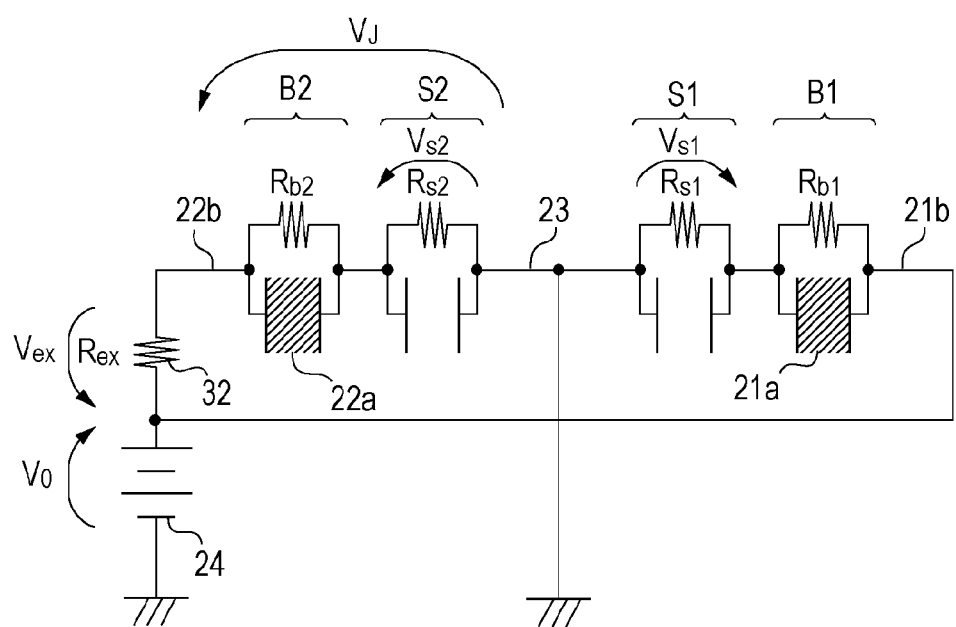
FIG. 7C is a diagram illustrating an equivalent circuit of the driving transmission device.

FIG. 6 is a perspective view of a driving transmission device 50 according to this embodiment. FIG. 7A is a sectional view taken along a line VIIA of FIG. 6, and an applied voltage is schematically added. FIG. 7B is a sectional view taken along a line VIIB of FIG. 7A. FIG. 7C is a diagram illustrating an equivalent circuit of the driving transmission device 50 representing an electric characteristic.

This embodiment is the same as the first embodiment except for a configuration in which a voltage is applied between pulleys 21 and 22 and a belt 23.

Unlike the first embodiment, a single voltage applying unit 24 is employed and a potential difference between the driven pulley 22 and the belt 23 is reduced by connecting an external resistance 32 on a voltage applying path to the pulley having the long belt winding length (driven pulley 22) in series. Specifically, the external resistance 32 is electrically connected to a metal layer 22b of the driven pulley 22 in series.

Since the external resistance 32 is disposed on the voltage applying path to the driven pulley 22 in series, a voltage applied by the voltage applying unit 24 is divided by a resistance ($R_{s2}+R_{b2}$) between the metal layer 22b and the belt 23 and the external resistance 32. In this way, a potential difference between the driven pulley 22 and the belt 23 may be reduced.

As a concrete example, a setting of voltages applied to the driving pulley 21 and the driven pulley 22 in a case where 2.5 kgf is to be ensured as transmittable driving forces ($F_1$ and $F_2$) in the driving pulley 21 and the driven pulley 22 is considered. Values of voltages required for generating electrostatic absorption forces P for ensuring a driving force of 2.5 kgf are 520 V for the driving pulley 21 and 160 V for the driven pulley 22 similarly to the first embodiment.

The voltage of 520 V which is a necessary and sufficient voltage between the driving pulley 21 and the belt 23 is realized when a voltage of the voltage applying unit 24 is set to 520 V and is applied as it is. On the other hand, the voltage of 160 V which is a necessary and sufficient voltage between the driven pulley 22 and the belt 23 is realized by providing the external resistance 32 connected in the voltage applying path in series and dividing the voltage of 520 V of the voltage applying unit 24.

A setting value of resistance of the external resistance 32 may be obtained by Expression 8 which is obtained by modifying Expression 7 below for calculating the voltage division.

$$V_J = \frac{R_J}{R_{ex} + R_J} V_0 \quad \text{[Expression 7]}$$

$$R_{ex} = \frac{V_0}{V_J} R_J - R_J \quad \text{[Expression 8]}$$

Here, $R_{ex}$ represents a resistance value of the external resistance 32 to be obtained, $V_0$ represents a voltage of the voltage applying unit 24, and $V_J$ is a voltage (potential difference) applied between the metal layer 22b of the driven pulley 22 and the belt 23. Furthermore, $R_J$ represents a resistance between the metal layer 22b of the driven pulley 22 and the belt 23 and is equal to a sum of a resistance value $R_{s2}$ of the contact portion S2 between the driven pulley 22 and the belt 23 and a resistance value $R_{b2}$ of the dielectric bulk portion B2 of the driven pulley 22. The resistance $R_J$ varies also in accordance with a voltage value applied between the driven pulley 22 and the belt 23, and therefore, a voltage value obtained from a current supplied when the voltage of 160 V is applied is used in this embodiment. To measure the current supplied when the voltage of 160 V is applied between the driven pulley 22 and the 23 in advance, the voltage $V_0$ of the voltage applying unit 24 is set to 160 V without using an external resistance.

The voltage $V_0$ of the voltage applying unit 24 is divided into the voltage $V_J$ to be applied to a resistance Rj ($R_{s2}+R_{b2}$) between the metal layer 22b of the driven pulley 22 and the belt 23 and the voltage $V_{ex}$ to be applied to the external resistance 32 by the external resistance 32. To obtain the voltage $V_J$ of 160 V, the resistance $R_{ex}$ of the external resistance 32 obtained when the resistance Rj is 4 MΩ is 9 MΩ according to Expression 8, for example.

Next, a difference in power consumption is calculated. In a case where the creative method of the present invention is not reflected, that is, in a case where the voltage of 520 V is applied to the pulleys 21 and 22 in common, the current supplied to the driven pulley 22 is 3.25 mA and the power consumption is 1690 mW as described above.

In a case where the creative method of the present invention is reflected, that is, in a case where the external resistance 32 is additionally provided and the voltage of 160 V is applied between the driven pulley 22 and the belt 23, a current supplied to the driven pulley 22 is 0.04 mA and a power consumption is 6.4 mW which is considerably reduced.

According to this embodiment, since the external resistance 32 is connected in series to the second pulley (driven pulley 22) having the belt winding length longer than that of the first pulley (driving pulley 21), the current amount i2 becomes smaller than the current amount i1 and the Joule heat is reduced. Accordingly, even when the belt winding lengths of the pulleys are different from each other, heat generated between the pulleys and the belt may be suppressed while reduction of vibration and noise and prevention of slip of the belt relative to the pulleys are attained.

Note that a power consumption of the external resistance 32 is 14.4 mW, and even when the power consumption of the driven pulley 22 and the power consumption of the external resistance 32 are added to each other, an effect of reduction of power consumption is sufficiently attained when compared with the case where the creative method of the present invention is not reflected. If the external resistance 32 is disposed separately from the driven pulley 22 and the belt 23, influence of heat generation of the external resistance 32 itself to the belt 23 is reduced.

A resistance element to be disposed is not limited to the external resistance 32, and when a zener diode is used instead, a configuration in which a voltage is applied to one of the driving pulley 21 and the driven pulley 22 and a voltage of a difference between an applied voltage and a zener voltage is applied may be employed.

As another applicable configuration, in addition to the other configuration of the first embodiment, a configuration in which a voltage is applied to the belt 23 and the metal layers 21b and 22b of the pulleys 21 and 22 are grounded may be employed.

According to the first and second embodiments, the method for differentiating a first potential difference applied between the conductive portion of the first pulley and the belt 23 and a second potential difference applied between the conductive portion of the second pulley and the belt 23 is employed. On the other hand, according to third to fifth embodiments described below, even if voltages (potential differences) between the conductive portions of the pulleys 21 and 22 and the belt 23 are the same as each other, an excessive electrostatic absorption force is reduced. As outline of such a configuration, an excessive electrostatic absorption force and an excessive current amount are reduced by differentiating resistance values between the conductive portions of the pulleys and the belt 23.

Third Embodiment

Figure 8:
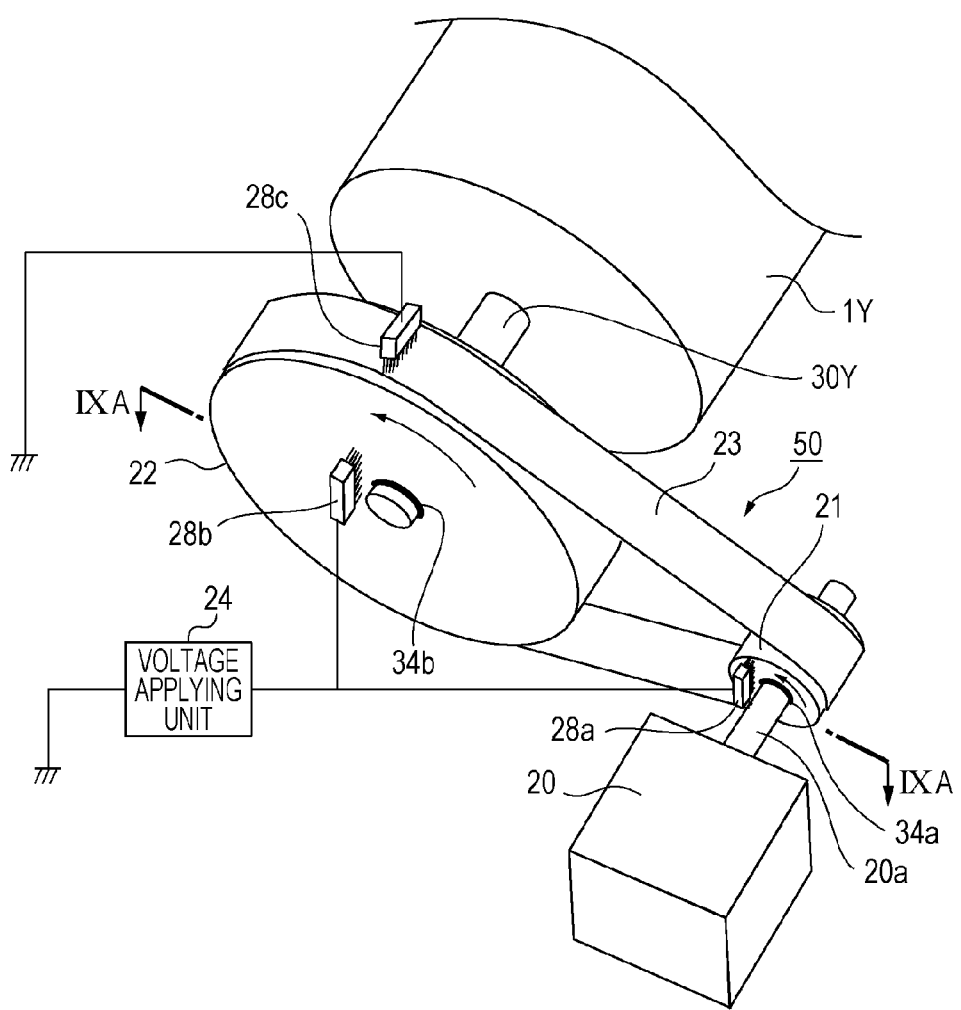
FIG. 8 is a perspective view of a driving transmission device according to a third embodiment.
Figure 9A:
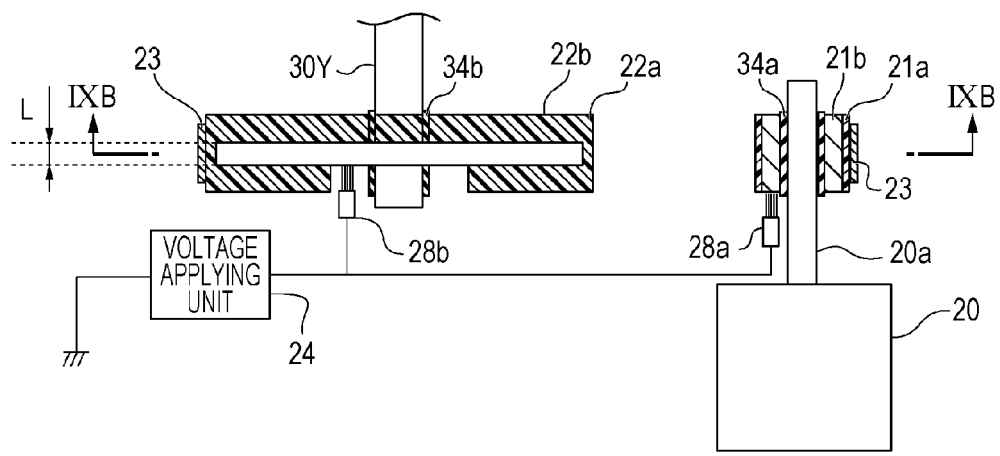
FIG. 9A is a sectional view taken along a line IXA of FIG. 8.
Figure 9B:
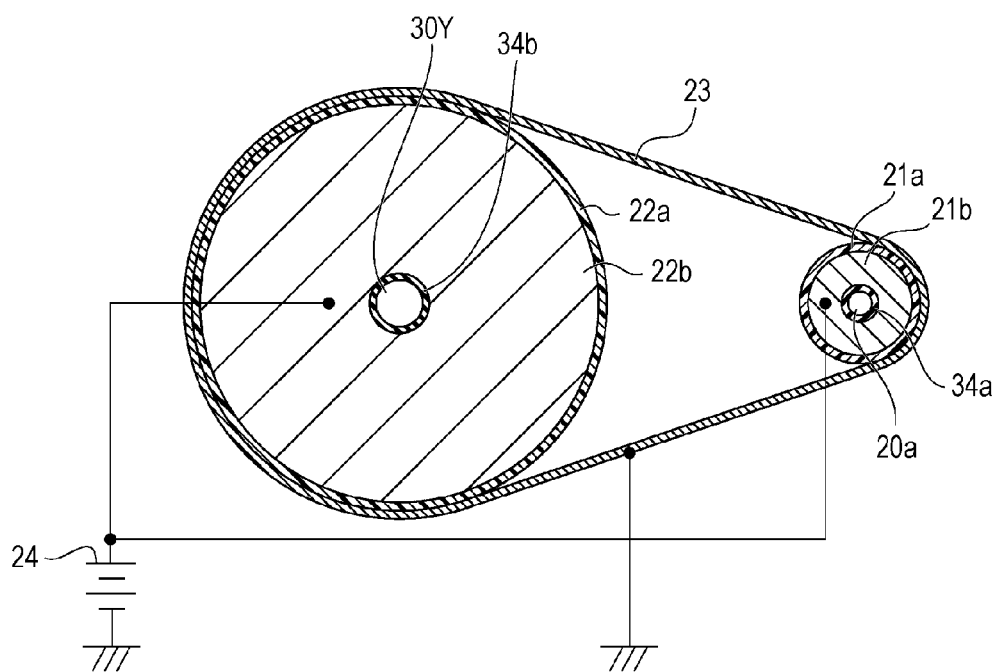
FIG. 9B is a sectional view taken along a line IXB of FIG. 9A.
Figure 9C:
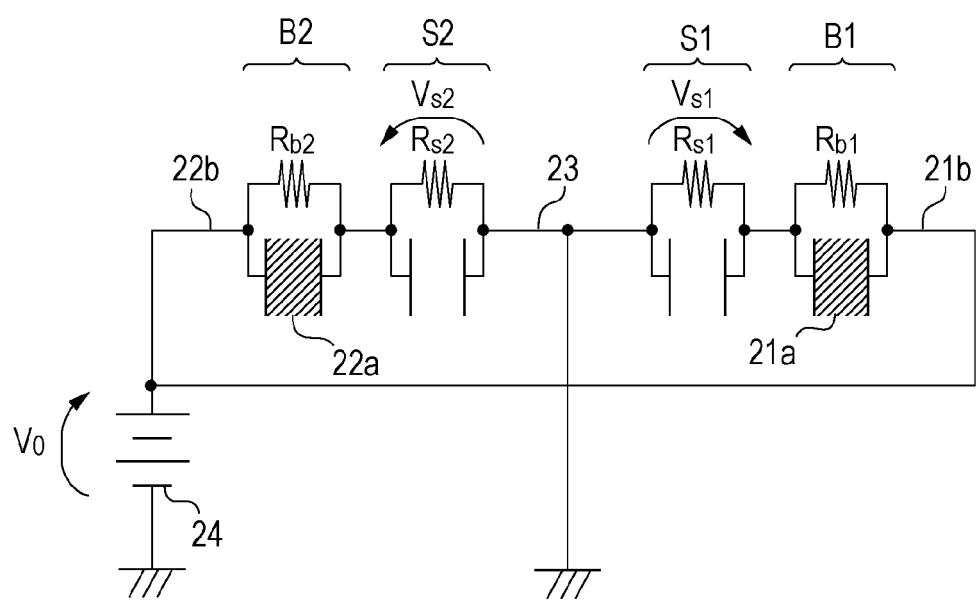
FIG. 9C is a diagram illustrating an equivalent circuit of the driving transmission device.

FIG. 8 is a perspective view of a driving transmission device 50 according to a third embodiment. FIG. 9A is a sectional view taken along a line IXA of FIG. 8, and an applied voltage is schematically added. FIG. 9B is a sectional view taken along a line IXB of FIG. 9A. FIG. 9C is a diagram illustrating an equivalent circuit of the driving transmission device 50 representing an electric characteristic.

In this embodiment, as a method for changing resistance values between conductive portions of pulleys and a belt, contact areas per unit length of belt winding in which the conductive portions of the pulleys and the belt 23 face each other are differentiated in accordance with a difference between belt winding lengths.

As illustrated in FIG. 9A, a width of a metal layer 22b of a driven pulley 22 having a longer belt winding length (hereinafter referred to as an "electrode width L") is reduced when compared with the first embodiment. When the electrode width L is reduced, a facing width b to the belt 23 is reduced and a contact area per unit length of the belt winding is reduced.

The width of the metal layer 22b of the driven pulley 22 which functions as an electrode is reduced and a dielectric layer 22a is exposed while covering not only an outer circumference of the metal layer 22b but also a side surface of the metal layer 22b. However, a portion which is not covered by the dielectric layer 22a is required to be provided on the side surface of the metal layer 22b so that a voltage is applied to the metal layer 22b from a voltage applying unit 24 using a conductive brush 28b. Although the single voltage applying unit 24 is provided as a voltage applying device similarly to the second embodiment, the external resistance 32 is not provided (refer to FIGS. 9B and 9C). Other configurations are the same as those of the second embodiment.

Although the width of the metal layer 21b of the driving pulley 21 and the width of the metal layer 22b of the driven pulley 22 are both 10 mm in the first embodiment, a case where only the electrode width L of the metal layer 22b is reduced to 2 mm will be described as a concrete example in this embodiment.

A voltage $V_0$ of 520 V is applied in common by the voltage applying unit 24 to a metal layer 21b of a driving pulley 21 and the metal layer 22b of the driven pulley 22. Although a resistance value between the metal layer 22b and the belt 23 obtained at a time when the voltage of 520 V is applied is 160 kΩ when the electrode width L is 10 mm, the resistance value is increased to 800 kΩ which is five times as large as the resistance value of 160 kΩ since a contact area is reduced to a one-fifth contact area owing to the electrode width reduced to 2 mm.

Accordingly, an amount of current supplied to the driven pulley 22 when the voltage of 520 V is applied which is 3.25 mA in a case of the electrode width L of 10 mm is reduced to 0.65 mA since the electrode width L is reduced to 2 mm. A power consumption of 1690 W in the case where the electrode width L is 10 mm is considerably reduced to 338 mW since the electrode width L is reduced to 2 mm.

As with the first embodiment, an amount of current supplied to the driving pulley 21 is 0.27 mA. Since the belt winding length of the driven pulley 22 is 12 times as long as that of the driving pulley 21, in terms of a current amount per unit length of belt winding, a current amount i2 is smaller than a current amount i1 also in this embodiment.

Next, a transmittable driving force is considered. An electrostatic absorption force P obtained when the voltage of 520 V is applied between pulleys and a belt is 400 kPa according to FIG. 5. It is assumed that a tension T is 0 and a friction coefficient μ between the belt and the pulley is 0.3. According to Expression 4, a transmittable driving force $F_2$ at a time when the electrostatic absorption force P is applied is 2.5 kgf.

As for the driven pulley 22, although a transmittable driving force obtained when the electrode width L is 10 mm is 27.3 kgf which is excessive when compared with that of the driving pulley 21, the excessive transmittable driving force is considerably reduced to 5.5 kgf since the electrode width L is reduced to 2 mm. Since a transmittable driving force of an entire system is controlled in accordance with a transmittable driving force of the driving pulley 21 which has a shorter belt winding length, the reduction of the electrode width L to 2 mm does not affect the transmittable driving force of the entire system.

According to this embodiment, since the electrode width L of the driven pulley 22 is reduced, the contact area in which the metal layer 22b and the belt 23 face each other may be reduced and the excessive transmittable driving force of the driven pulley 22 having the longer belt winding length may be reduced. By this, even when the belt winding lengths of the pulleys are different from each other, heat generated between the pulleys and the belt may be suppressed while reduction of vibration and noise and prevention of slip of the belt relative to the pulleys are attained.

Note that a method for changing the contact area per unit length of the belt winding between the belt 23 and the pulley is not limited to change of the electrode width L of the pulley. As another method, a width of a dielectric layer of the pulley may be reduced. Furthermore, instead of reduction in a width direction, a contact area may be changed by forming various patterns, such as a zigzag pattern, on a contact surface. Moreover, as illustrated in a modification of FIG. 10, a configuration in which one of pulleys has a crown shape so that heights relative to contact surfaces are differentiated may be employed.

Figure 10:
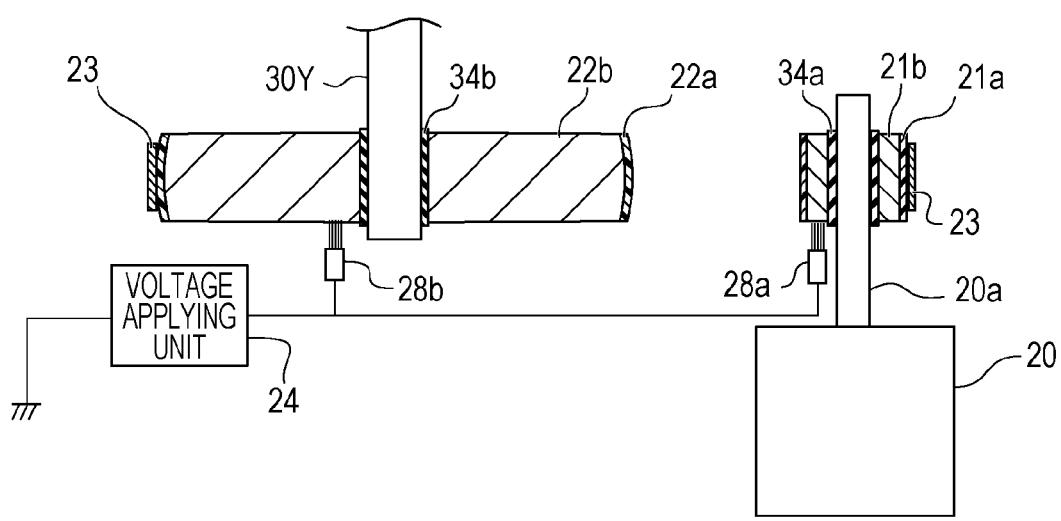
FIG. 10 is a sectional view of a driving transmission device including a driven pulley according to a modification.

FIG. 10 is a sectional view of a driving transmission device 50 including a driven pulley 22 according to a modification. In the driven pulley 22, a metal layer 22b and a dielectric layer 22a are curved in a width direction so as to have a convex shape. Specifically, in a sectional view which is viewed in parallel to a supporting shaft of the driven pulley 22, an outer circumference portion of the driven pulley 22 has a rounded shape. By this, a substantial contact area in which the metal layer 22b functioning as an electrode faces the belt 23 is reduced.

As another method, a contact area may be reduced by roughly forming an outer circumference surface of a pulley which is in contact with the belt 23. As a method for changing a roughness of the surfaces of the pulley which is in contact with the belt 23, a method for grinding the surfaces using a turning machine, lapping polishing in which a surface is polished by polishing member having loose grains dispersed thereon, or sandblast in which polishing agent is sprayed may be employed.

Note that in a case where a dielectric layer is disposed on a surface on the belt 23 which faces a pulley, a contact area may be changed by changing a shape of an electrode (metal layer).

Fourth Embodiment

Figure 11A:
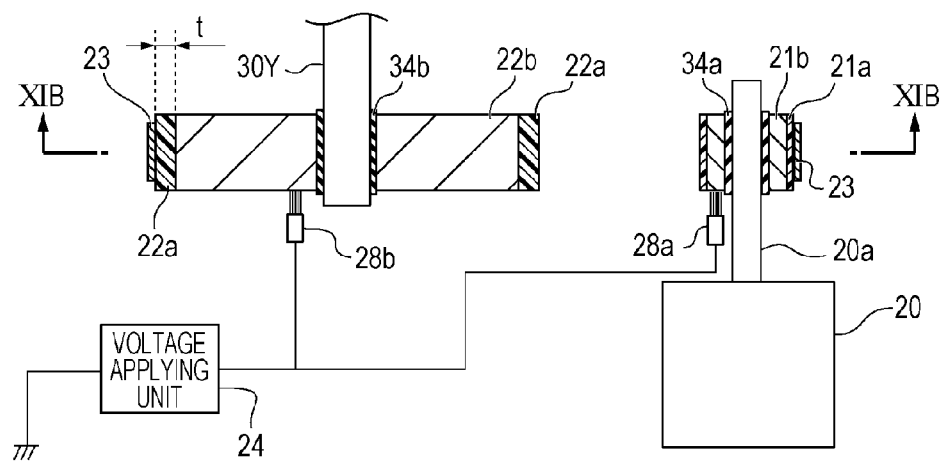
FIG. 11A is a perspective view of a driving transmission device according to a fourth embodiment.
Figure 11B:
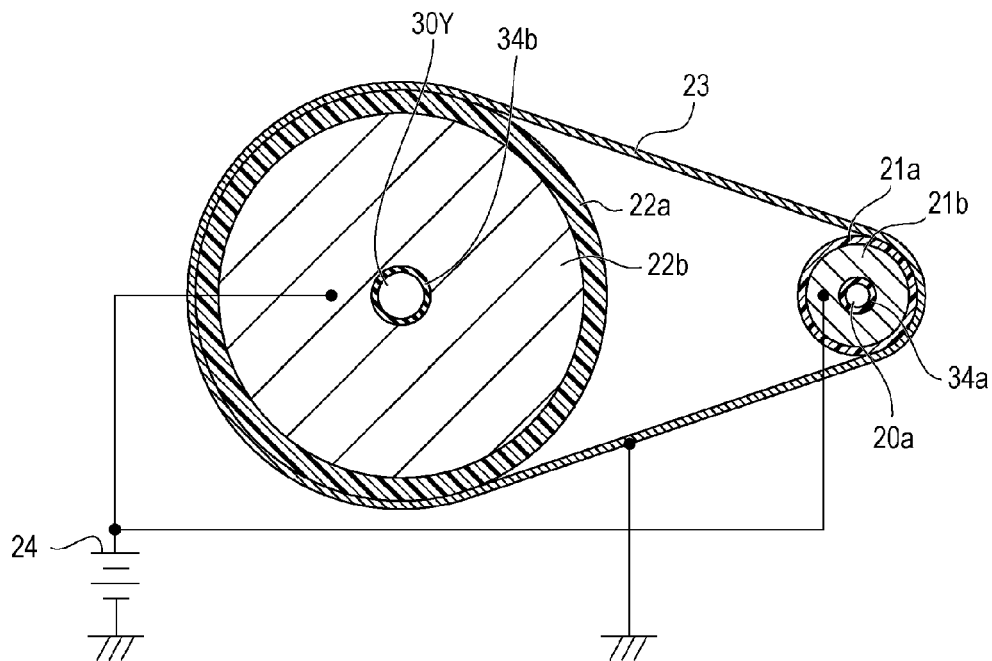
FIG. 11B is a sectional view taken along a line XIB of FIG. 11A.
Figure 11C:
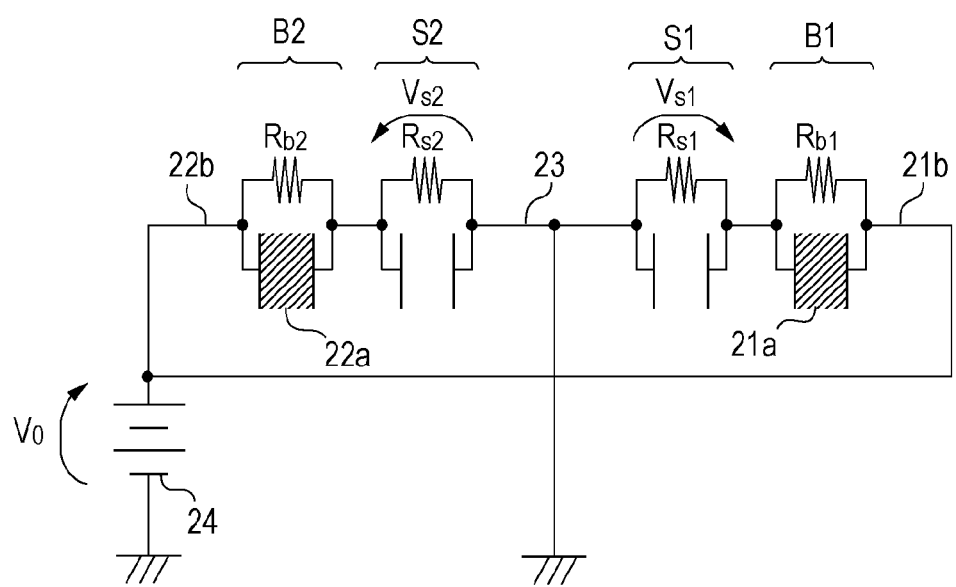
FIG. 11C is a diagram illustrating an equivalent circuit of the driving transmission device.

FIG. 11A is a perspective view of a driving transmission device 50 according to a fourth embodiment and corresponds to FIG. 9A. FIG. 11B is a sectional view taken along a line XIB of FIG. 11A. FIG. 11C is a diagram illustrating an equivalent circuit of the driving transmission device 50 representing an electric characteristic.

In this embodiment, as a method for changing a resistance value between a conductive portion of a pulley and a belt, a thickness of a dielectric layer serving as the conductive portion of the pulley, that is, a film thickness t, is changed. When a film thickness t of a dielectric layer 22a of a driven pulley 22 having a long belt winding length is increased, a resistance between the driven pulley 22 and a belt 23 is increased and an amount of current supplied to the driven pulley 22 is reduced so that heat generation caused by power consumption is suppressed.

Specifically, although film thicknesses of the dielectric layers 21a and 22a of the driving pulley 21 and the driven pulley 22 are 70 μm in common in the third embodiment, only the thickness t of the dielectric layer 22a of the driven pulley 22 is increased to 280 μm in the fourth embodiment. A single voltage applying unit 24 is provided as a voltage applying device similarly to the third embodiment, and contact areas of the driving pulley 21 and the driven pulley 22 relative to the belt 23 are the same as each other. Other configurations are the same as those of the third embodiment.

A voltage $V_0$ of 520 V is applied in common by the voltage applying unit 24 to a metal layer 21b of a driving pulley 21 and the metal layer 22b of the driven pulley 22. A resistance value between the metal layer 22b of the driven pulley 22 and the belt 23 at a time when the voltage of 520 V is applied is 160 kΩ when the film thickness of the dielectric layer 22a is 70 μm. In this case, a resistance between the driven pulley 22 and the belt 23 includes a resistance $R_{s2}$ of a contact portion S2 and a resistance $R_{b2}$ of a dielectric bulk portion B2 and resistance values thereof are approximately 120 kΩ and approximately 40 kΩ, respectively.

On the other hand, in this embodiment, a resistance between the driven pulley 22 and the belt 23 in a case where the film thickness t of the dielectric layer 22a is 280 μm is 520 kΩ and a resistance $R_{b2}$ of the dielectric bulk portion B2 is 480 kΩ which is four times as large as that in the foregoing case. Specifically, the resistance $R_{s2}$ of the contact portion S2 is not changed from approximately 40 kΩ but the resistance $R_{b2}$ is increased.

The resistance $R_{b2}$ of the dielectric bulk portion B2 may be obtained from a current obtained at a time when voltages are applied to opposite ends of the dielectric layer 22a after metal is evaporated on a surface of the dielectric layer 22a of the driven pulley 22 which is in contact with the belt 23. The resistance $R_{s2}$ of the contact portion S2 may be obtained by subtracting the resistance $R_{b2}$ from the value of the resistance between the metal layer 22b of the driven pulley 22 and the belt 23.

In this embodiment, since the film thickness t of the dielectric layer 22a is increased from 70 μm to 280 μm so that the resistance is increased from 160 kΩ to 520 kΩ, an amount of current supplied to the driven pulley 22 is reduced from 3.25 mA to 1 mA. The power consumption of the driven pulley 22 is reduced from 1690 mW to 520 mW.

As with the first embodiment, an amount of current supplied to the driving pulley 21 is 0.27 mA. Since the belt winding length of the driven pulley 22 is 12 times as long as that of the driving pulley 21, in terms of a current amount per unit length of belt winding, a current amount i2 is smaller than a current amount i1 also in this embodiment.

According to this embodiment, even when the belt winding lengths of the pulleys are different from each other, heat generated between the pulleys and the belt may be suppressed while reduction of vibration and noise and prevention of slip of the belt relative to the pulleys may be attained.

Note that, when the resistance $R_{b2}$ of the dielectric bulk portion B2 is increased, a voltage applied to the contact portion S2 is reduced and an electrostatic absorption force is reduced. Consequently, an excessive electrostatic absorption force of the driven pulley 22 may be reduced.

Fifth Embodiment

In a fifth embodiment, as a method for changing a resistance value between a conductive portion of a pulley and a belt, a volume resistivity of a dielectric layer serving as the conductive portion of the pulley is changed. A volume resistivity of a dielectric layer 22a of a driven pulley 22 having a long belt winding length is increased so that a resistance between the driven pulley 22 and a belt 23 is increased, and accordingly, an amount of current supplied to the driven pulley 22 is reduced. In this way, heat generation caused by power consumption is suppressed.

Figure 12:
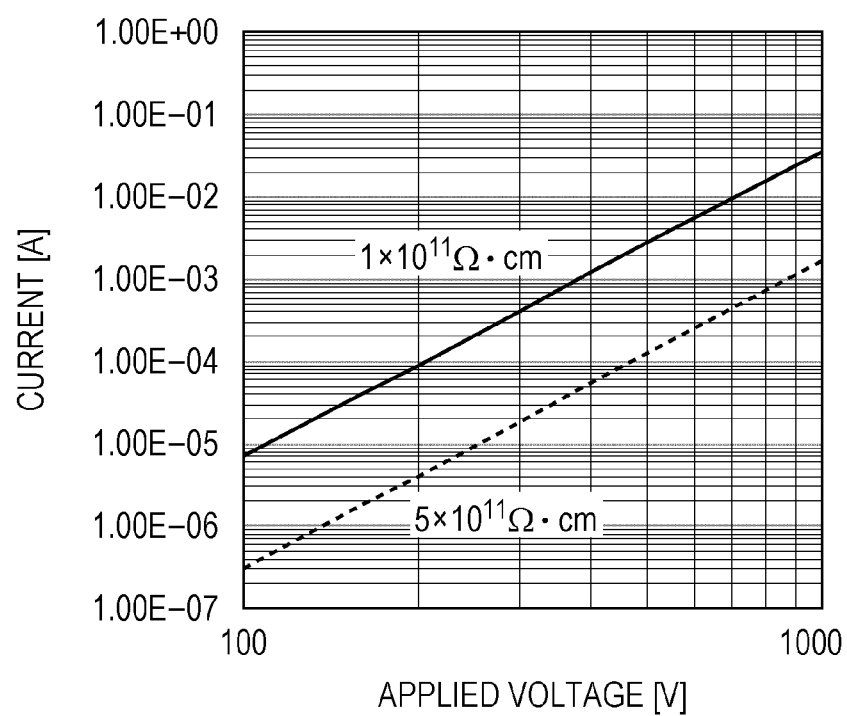
FIG. 12 is a diagram illustrating the relationship between an applied voltage and a current obtained when a volume resistivity of a dielectric layer is changed.

FIG. 12 is a diagram illustrating the relationship between an applied voltage and a current of the driven pulley 22 when a volume resistivity of the dielectric layer 22a is changed. According to FIG. 12, when the volume resistivity of the dielectric layer 22a is increased, a supplied current is reduced and power consumption is suppressed.

According to the first to fourth embodiments, a volume resistivity of the dielectric layer 21a of the driving pulley 21 having a short belt winding length and a volume resistivity of the dielectric layer 22a of the driven pulley 22 having a long belt winding length are both $1 \times 10^{11}$ Ω·cm. On the other hand, in this embodiment, only a volume resistivity of the dielectric layer 22a of the driven pulley 22 is increased to $5 \times 10^{11}$ Ω·cm. As a voltage applying device, a single voltage applying unit 24 is provided similarly to the third embodiment, and contact areas of a driving pulley 21 and the driven pulley 22 relative to the belt 23 are the same as each other. Other configurations are the same as those of the third embodiment.

A voltage $V_0$ of 520 V is applied in common by the voltage applying unit 24 to a metal layer 21b of a driving pulley 21 and the metal layer 22b of the driven pulley 22. When the volume resistivity of the dielectric layer 22a is $1 \times 10^{11}$ Ω·cm, an amount of current supplied to the driven pulley 22 is 3.25 mA. However, since the volume resistivity of the dielectric layer 22a is increased to $5 \times 10^{11}$ Ω·cm, the amount of current is reduced to 0.15 mA. The power consumption of the driven pulley 22 is reduced from 1690 mW to 78 mW, and accordingly, heat generation caused by the power consumption is suppressed.

As with the first embodiment, an amount of current supplied to the driving pulley 21 is 0.27 mA. Since the belt winding length of the driven pulley 22 is 12 times as long as that of the driving pulley 21, in terms of a current amount per unit length of belt winding, a current amount i2 is smaller than a current amount i1 also in this embodiment.

According to this embodiment, even when the belt winding lengths of the pulleys are different from each other, heat generated between the pulleys and the belt may be suppressed while reduction of vibration and noise and prevention of slip of the belt relative to the pulleys are attained.

When the dielectric layer 22a is increased, an electrostatic absorption force obtained when the same voltage is applied is reduced. Consequently, an excessive electrostatic absorption force of the driven pulley 22 may be reduced.

In the third to fifth embodiment described above, an excessive current amount and an excessive electrostatic absorption force are reduced by differentiating resistance values between the conductive portions of the pulleys having different belt winding lengths and the belt. On the other hand, a case where such a creative method is not employed, that is, a case where contact areas between the dielectric layers and the belt per unit length of winding, volume resistivities of the dielectric layers, and film thicknesses t of the dielectric layers of the pulleys are the same as each other, is considered. In this case, values obtained by multiplying the belt winding lengths of the pulleys by the resistance values between the pulleys and the belt are the same as each other. This is because the longer a belt winding length is, the smaller a resistance value is.

As an example, a case where a radius $r_1$ of the driving pulley 21 is 20 mm, a belt winding angle $\theta_1$ of the driving pulley 21 is 120 degrees, a radius $r_2$ of the driven pulley 22 is 120 mm, and a belt winding angle $θ_2$ of the driven pulley 22 is 240 degrees will be described. The belt winding length of the driven pulley 22 is 12 times as long as that of the driving pulley 21. Here, a value of resistance between the driven pulley 22 and the belt 23 is 160 kΩ and a value of resistance between the driving pulley 21 and the belt 23 is 1920 kΩ, that is, the resistance value of the driven pulley 22 is one-twelfth of that of the driving pulley 21. In this way, values obtained by multiplying the belt winding lengths of the pulleys with the resistance values between the pulleys and the belt are the same as each other provided that the other conditions are the same.

In the third to fifth embodiments, values obtained by multiplying the belt winding lengths of the pulleys by the resistance values are compared with each other. First, a value obtained by multiplying the belt winding length of the driven pulley 22 which is the longer belt winding length by the value of the resistance between the driven pulley 22 and the belt 23 is represented as a "multiplying value R-22". On the other hand, a value obtained by multiplying the belt winding length of the driving pulley 21 which is the shorter belt winding length by the value of the resistance between the driving pulley 21 and the belt 23 is represented as a "multiplying value R-21". In each of the third to fifth embodiments, the multiplying value R-22 is larger than the multiplying value R-21. As described above, the state in which the multiplying value R-22 is larger than the multiplying value R-21 is satisfied by differentiating at least one of the contact areas per unit length of winding, the film thicknesses of the dielectric layers, and the volume resistivities of the dielectric layers between the pulleys, and in this way, an excessive current amount and an excessive electrostatic absorption force may be reduced.

Note that, when the state in which the multiplying value R-22 is larger than the multiplying value R-21 is to be satisfied, values obtained by multiplying resistances $R_s$ of the contact portions S on the belt winding lengths may be used. Specifically, a value obtained by multiplying an electrical contact resistance value by the belt winding length of the pulley having the longer belt winding length is larger than a value obtained by multiplying an electrical contact resistance value by the belt winding length of the pulley having the shorter belt winding length. This is realized by reducing the contact area per unit length of the belt winding of the pulley having the longer belt winding length.

In the foregoing embodiments, the belt 23 may be wound on a plurality of pulleys, and a case where two driven pulleys are employed is described with reference to FIGS. 13 and 14 as an example.

Figure 13:
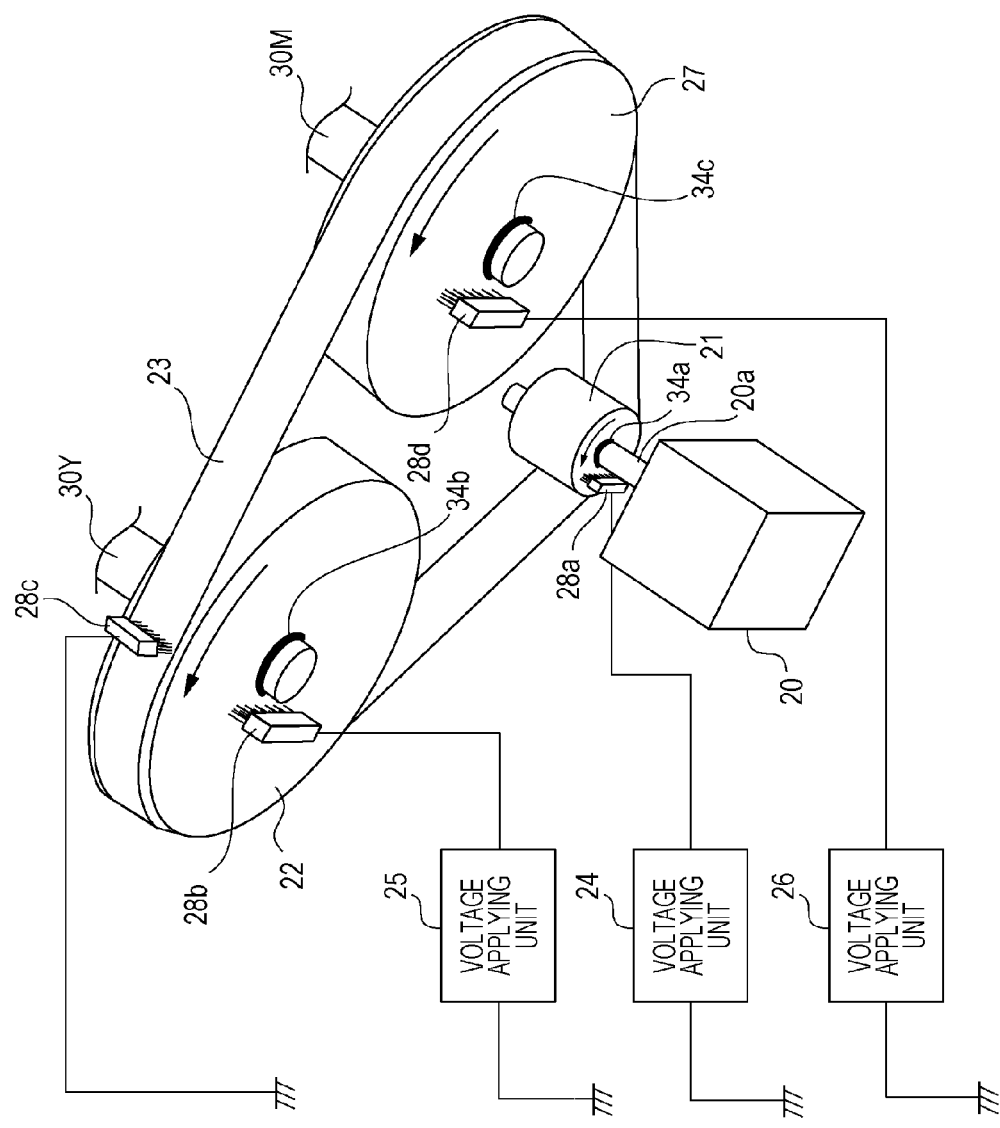
FIG. 13 is a sectional view of a driving transmission device including two driven pulleys.

FIG. 13 is a perspective view of a driving transmission device 50 including two driven pulleys as a modification. FIG. 14 is a diagram illustrating an equivalent circuit of the driving transmission device 50 representing an electric characteristic.

In this configuration, the driving transmission device 50 includes one belt 23, one driving pulley 21, and a plurality of (two) driven pulleys 22 and 27. Torque of the driving pulley 21 which is driven by rotation by a motor 20 is transmitted to the driven pulleys 22 and 27 through the belt 23 and further transmitted to photoconductor drums 1Y and 1M through rotary shafts 30Y and 30M, respectively.

A radius and a belt winding angle of the driving pulley 21 are the same as those of the first embodiment. Radii of the driven pulleys 22 and 27 are both 120 mm and belt winding angles of the driven pulleys 22 and 27 are both 120 degrees. A deceleration system is configured such that speed is reduced from the driving pulley 21 to the driven pulleys 22 and 27 due to a difference between diameters of the pulleys.

Figure 14:
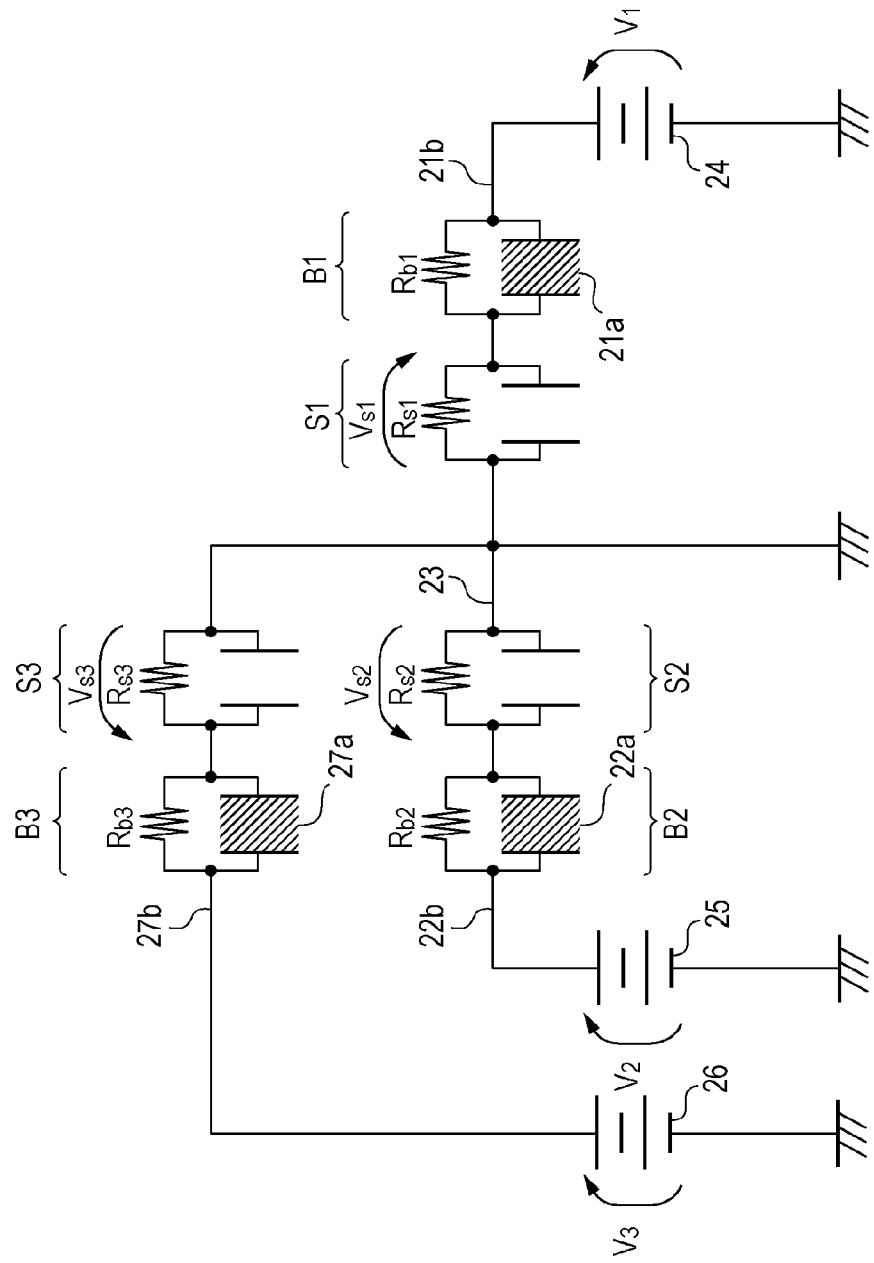
FIG. 14 is a diagram illustrating an equivalent circuit of the driving transmission device.

In FIG. 14, a metal layer 27b of the driven pulley 27 corresponds to a metal layer 22b of the driven pulley 22. A potential difference V3, a contact portion S3, a voltage $V_{s3}$, a resistance $R_{s3}$, a dielectric bulk portion B3, and a resistance $R_{b2}$ correspond to the potential difference V2, the contact portion S2, the voltage $V_{s2}$, the resistance $R_{s2}$, the dielectric bulk portion B2, and the resistance $R_{b2}$, respectively.

A configuration in which a current amount i2 per unit length of belt winding of the driven pulleys 22 and 27 is smaller than a current amount i1 of the driving pulley 21 is described taking a case where the method of the first embodiment is employed as a representative example.

A voltage applying unit 26 for the driven pulley 27 is added as a voltage applying device to the configuration of the first embodiment. Voltages applied to the driven pulleys 22 and 27 having long belt winding lengths are set smaller than a voltage applied to the driving pulley 21 having a short belt winding length. By this, as with the first embodiment, excessive transmittable driving forces of the driven pulleys 22 and 27 may be reduced and generated Joule heat may be reduced due to reduced supplied current.

As a concrete example, a setting of voltages applied to the driving pulley 21 and the driven pulleys 22 and 27 in a case where a transmittable driving force of 2.5 kgf is to be attained in the driving pulley 21 and the driven pulleys 22 and 27 is considered. It is assumed that a tension T of the belt 23 is 0 and a friction coefficient μ among the belt 23 and the pulleys 21, 22, and 27 is 0.3. Magnitudes of the electrostatic absorption forces per unit area required for the driving pulley 21 and the driven pulleys 22 and 27 are calculated in accordance with Expression 4.

Magnitudes of the electrostatic absorption forces per unit area required for the driving pulley 21 and the driven pulleys 22 and 27 are approximately 400 kPa and approximately 67 kPa, respectively. According to FIG. 5, voltages required for generating the electrostatic absorption forces per unit area are 520 V for the driving pulley 21 ($V_1$=520 V) and 210 V for the driven pulleys 22 and 27 ($V_2$=$V_3$=210 V).

Amounts of current supplied to the driven pulleys 22 and 27 at a time when a voltage of 210 V is applied to the driven pulleys 22 and 27 is 0.14 mA and power consumptions thereof are 29.4 mW.

On the other hand, when the voltage of 520 V is applied to the driven pulleys 22 and 27 in common without reflecting such a creative method, amounts of current supplied to the driving pulley 21 and the driven pulleys 22 and 27 are 0.27 mA and 1.63 mA, respectively. Power consumptions in the driven pulleys 22 and 27 are 845 mW.

Accordingly, a current amount, power consumption, and heat generation are reduced by reducing the voltages applied to the driven pulleys 22 and 27.

In the configuration illustrated in FIGS. 13 and 14, even if the creative method for reducing an applied voltage is employed only on one of the driven pulleys 22 and 27, an effect of suppression of heat generation is attained by a degree corresponding to the configuration.

The creative methods described in the second to fifth embodiments may be employed in a configuration in which a plurality of driven pulleys are employed as illustrated in FIGS. 13 and 14.

In the foregoing embodiments, a plurality of pairs of driven units which are targets of transmission of torque in the driving transmission device 50 and driving sources may be provided, and the present invention is applicable to the individual pairs. Furthermore, indirect coupling between a driven unit and a driven pulley and indirect coupling between a driving source and a driving pulley may be performed instead of direct coupling.

The present invention is not limited to the image forming apparatus and is applicable to a sheet processing apparatus and other various apparatuses. Furthermore, the present invention is applicable to not only image forming apparatuses employing an electrophotographic method but also image forming apparatuses employing other methods including a thermal transfer method and an inkjet method. When the inkjet method is employed, for example, a carriage belt used to drive a carriage may serve as the driven unit. When the thermal transfer method is employed, a platen roller may serve as the driven unit.

The preferred embodiments of the present invention have been described hereinabove. The present invention is not limited to the specific embodiments and various modifications which do not depart from the scope of the present invention may be included in the present invention. Portions of the foregoing embodiments may be appropriately combined with each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-068638, filed Mar. 28, 2014, which is hereby incorporated by reference herein in its entirety.

What is claimed is:

1. A driving transmission device comprising:
   a first pulley including a dielectric layer;
   a second pulley including a dielectric layer;
   an endless belt which is wound on the first pulley and the second pulley;
   a power supply unit configured to supply a first voltage to the first pulley such that the first pulley and the endless belt are electrostatically attracted to each other, and supply a second voltage to the second pulley such that the second pulley and the endless belt are electrostatically attracted to each other,
   wherein a length of a portion of the endless belt which is wound on the second pulley is longer than a length of a portion of the endless belt which is wound on the first pulley,
   wherein the first pulley and the second pulley are electrically connected with each other via the endless belt,
   wherein the first pulley and the second pulley are electrically connected in parallel with the power supply unit, and
   wherein the second voltage is smaller than the first voltage.

2. The driving transmission device according to claim 1, wherein the power supply unit includes a first power source unit which supplies the first voltage to the first pulley and a second power source unit which supplies the second voltage to the second pulley.

3. The driving transmission device according to claim 1, wherein the power supply unit includes a resistance element in a power supply line disposed between the power source unit and the second pulley.

4. The driving transmission device according to claim 1, wherein
   the first pulley includes a first metal layer
   the second pulley includes a second metal layer.

5. The driving transmission device according to claim 4, wherein a width of the second metal layer in a direction parallel to an axis of a rotary shaft of the second pulley is smaller than a width of the first metal layer in a direction parallel to an axis of a rotary shaft of the first pulley.

6. The driving transmission device according to claim 4, wherein a thickness of the second dielectric layer is thicker than a thickness of the first dielectric layer.

7. The driving transmission device according to claim 1, wherein volume resistivity of the dielectric layers is equal to or larger than $1 \times 10^9$ $\Omega \cdot$cm and smaller than $1 \times 10^{14}$ $\Omega \cdot$cm.

8. The driving transmission device according to claim 1, wherein a diameter of the second pulley is larger than a diameter of the first pulley.

9. An image forming apparatus comprising:
   a driving unit including a first pulley and configured to rotary drive the first pulley;
   a second pulley including a rotary shaft;
   a belt which is wound on the first pulley and the second pulley;
   a power supply unit configured to supply a first voltage to the first pulley such that the first pulley and the belt are electrostatically attracted to each other, and supply a second voltage to the second pulley such that the second pulley and the belt are electrostatically attracted to each other;
   a photosensitive member connected to the rotary shaft of the second pulley;
   an exposure unit configured to expose the photosensitive member to form an electrostatic latent image;
   a developing unit configured to develop the electrostatic latent image with toner to form an image on the photosensitive member;
   an intermediate transfer member to which the image formed is transferred;
   a transfer unit configured to transfer the image on the intermediate transfer member to a sheet; and
   a fixing unit configured to heat the image transferred to the sheet by the transfer unit and fix the image onto the sheet,
   wherein a length of a portion of the belt that is wound on the second pulley is longer than a length of a portion of the belt that is wound on the first pulley,
   wherein the first pulley and the second pulley are electrically connected with each other via the belt,
   wherein the first pulley and the second pulley are electrically connected in parallel with the power supply unit, and
   wherein the second voltage is smaller than the first voltage.

10. The image forming apparatus according to claim 9, wherein the power supply unit includes a first power source unit which supplies the first voltage to the first pulley and a second power source unit which supplies the second voltage to the second pulley.

11. The image forming apparatus according to claim 9, wherein the power supply unit includes a resistance element in a power supply line disposed between the power source unit and the second pulley.

12. The image forming apparatus according to claim 9, wherein
   the first pulley includes a first metal layer, and
   the second pulley includes a second metal layer.

13. The image forming apparatus according to claim 12, wherein a width of the second metal layer in a direction parallel to an axis of the rotary shaft of the second pulley is smaller than a width of the first metal layer in a direction parallel to an axis of another rotary shaft of the first pulley.

14. The image forming apparatus according to claim 12, wherein a thickness of the second dielectric layer is thicker than a thickness of the first dielectric layer.

15. The image forming apparatus according to claim 9, wherein a diameter of the second pulley is larger than a diameter of the first pulley.

* * * * *